(12) United States Patent
Zhang et al.

(10) Patent No.: US 12,232,054 B2
(45) Date of Patent: *Feb. 18, 2025

(54) USER EQUIPMENT FOR SATELLITE COMMUNICATION

(71) Applicant: Sony Group Corporation, Tokyo (JP)

(72) Inventors: Yuan Zhang, Nanjing (CN); Penshun Lu, Beijing (CN); Wenbo Zhang, Beijing (CN); Hiromasa Uchiyama, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/513,696

(22) Filed: Nov. 20, 2023

(65) Prior Publication Data
US 2024/0089873 A1 Mar. 14, 2024

Related U.S. Application Data

(63) Continuation of application No. 18/161,891, filed on Jan. 31, 2023, now Pat. No. 11,871,365, which is a
(Continued)

(30) Foreign Application Priority Data
Jun. 19, 2018 (CN) .......................... 201810631481.4

(51) Int. Cl.
H04W 84/06 (2009.01)
H04W 36/30 (2009.01)
(Continued)

(52) U.S. Cl.
CPC ....... H04W 52/367 (2013.01); H04W 36/304 (2023.05); H04W 52/288 (2013.01);
(Continued)

(58) Field of Classification Search
None
See application file for complete search history.

(56) References Cited

U.S. PATENT DOCUMENTS 6,856,787 B2  2/2005 Karabinis
8,743,709 B1* 6/2014 Stegall ................ H04L 65/1073
                                                         370/254
(Continued)

FOREIGN PATENT DOCUMENTS

CA    2515209 A1  11/2004
CA    2440609 C    5/2011
(Continued)

OTHER PUBLICATIONS

International Search Report and Written Opinion mailed on Aug. 20, 2019, received for PCT Application No. PCT/CN2019/090804, Filed on Jun. 12, 2019, 11 pages.
(Continued)

Primary Examiner — Ajit Patel
(74) Attorney, Agent, or Firm — XSENSUS LLP

(57) ABSTRACT

Disclosed is a user equipment for satellite communication, comprising one or more processing circuits configured to execute the following operations: evaluating a transmission power requirement for a user equipment to communicate with a satellite; and assisting, via an auxiliary device, the user equipment in executing at least part of the communication with the satellite when the transmission power constraint of the user equipment fails to meet the transmission power requirement, wherein the processing circuits are further configured to acquire, via the satellite, a communication mode to be switched to, and the processing circuits transmit, to the satellite, a notification indicating that a current communication mode needs to be switched, with the notification comprising information indicating the need to
(Continued)

switch to a communication mode that meets the transmission power requirement.

9 Claims, 13 Drawing Sheets

Related U.S. Application Data continuation of application No. 17/251,821, filed as application No. PCT/CN2019/090804 on Jun. 12, 2019, now Pat. No. 11,595,916.

(51) Int. Cl.

| | |
|---|---|
| *H04W 52/28* | (2009.01) |
| *H04W 52/36* | (2009.01) |
| *H04W 72/044* | (2023.01) |
| *H04W 72/23* | (2023.01) |
| *H04W 74/0833* | (2024.01) |
| *H04W 76/15* | (2018.01) |

(52) U.S. Cl.
CPC ....... *H04W 72/23* (2023.01); *H04W 74/0833* (2013.01); *H04W 76/15* (2018.02)

(56) References Cited

U.S. PATENT DOCUMENTS

| | | | |
|---|---|---|---|
| 8,817,682 B1 * | 8/2014 | Goel | ........... H04W 52/0206 370/311 |
| 2004/0229616 A1 | 11/2004 | Dutta et al. | |
| 2006/0135070 A1 | 6/2006 | Karabinis | |
| 2008/0311904 A1 | 12/2008 | Courseille | |
| 2017/0105153 A1 | 4/2017 | Ashrafi et al. | |
| 2017/0366251 A1 | 12/2017 | Ravishankar et al. | |
| 2018/0041944 A1 | 2/2018 | Korneluk et al. | |
| 2018/0084476 A1 | 3/2018 | Kay et al. | |
| 2018/0084562 A1 | 3/2018 | Ramamurthi et al. | |
| 2018/0183511 A1 | 6/2018 | Oga et al. | |
| 2018/0192374 A1 | 7/2018 | Jain et al. | |
| 2018/0270604 A1 | 9/2018 | Yanagi et al. | |
| 2019/0007126 A1 | 1/2019 | Regunathan et al. | |

FOREIGN PATENT DOCUMENTS

| | | |
|---|---|---|
| CA | 2459549 C | 10/2012 |
| CN | 1788506 A | 6/2006 |
| CN | 1799208 A | 7/2006 |
| CN | 101808380 A | 8/2010 |
| CN | 104469872 A | 3/2015 |
| CN | 105763241 A | 7/2016 |
| EP | 1625759 A2 | 2/2006 |
| EP | 2621225 A1 | 7/2013 |
| EP | 2952038 A1 | 12/2015 |
| WO | WO-2011105945 A1 | 9/2011 |

OTHER PUBLICATIONS

Michael Crosnier et al: "Handover Management Optimization for LTE Terrestrial Network with Satellite Backhaul", Vehicular Technology Conference (VTC Spring), 2011 IEEE 73rd, May 1, 2011 (May 1, 2011), pp. 1-5, XP055565874, DOI: 10.1109/VETECS. 2011. 5956545 ISBN: 978-1-4244-8332-7 'Sections III-IV'.

Thales: "NR-NTN:Chap 7.3—NR modifications to support the Non-Terrestrial Network", 3GPP Draft; R1-1807794 TR38.811 Chap 7.3 NR Impacts Vio, 3rd Generation Partnership Project (3GPP), Mobile Competence Centre 650, Route Des Lucioles;F-06921 Sophia-Antipolis Ced Ex; France vol. RAN WG1,no. Busan, Korea;May 21, 2018-May 25, 2018 May 29, 2018(May 29, 2018),XP051463502, Retrieved from the Internet: URL: http://www.3gpp.org/ftp/tsg%5Fran/WG1%5FRL1/TSGR1%5_F93/Docs [retrieved on May 29, 2018] 'Section 7.3.3.1.2'.

* cited by examiner (a)

(b)

USER EQUIPMENT FOR SATELLITE COMMUNICATION

CROSS-REFERENCE TO RELATED APPLICATIONS

The present application is a continuation of U.S. application Ser. No. 18/161,891, filed Jan. 31, 2023, which is a continuation of U.S. application Ser. No. 17/251,821, filed Dec. 14, 2020 (now U.S. Pat. No. 11,595,916), which is based on PCT filing PCT/CN2019/090804, filed Jun. 12, 2019, which claims priority to Chinese Patent Application No. 201810631481.4, filed Jun. 19, 2018 with the Chinese Patent Office, each of which is incorporated herein by reference in its entirety.

FIELD

The present disclosure relates to satellite communication in a mobile communication environment, in particular to a user equipment, a satellite communicating with the user equipment, an assistant device for assisting the user equipment to communicate with the satellite in the satellite communication, a method of performing satellite communication in a satellite communication system, and a computer readable storage medium.

BACKGROUND

Communications satellite is a satellite for transmitting and amplifying radio communication signals via a transponder, which establishes an information channel between a transmission station and a reception station on the ground. The communications satellite may be applied in fields such as television, telephone, broadcast, network and military. More than two thousand communications satellites run around the orbit of the earth, which are used by private and government agencies. In the radio communication, a signal is transmitted with electromagnetic waves which travel in straight lines and thus will be blocked by a curved surface of the earth. The communications satellite enables long-distance communication on the ground by transferring the signal on the surface of the earth. The communications satellite uses radio waves and microwave with a relatively wide frequency band. Since the satellite orbit is quite high above the ground, wave beams of antennas may cover a large area on the earth. In addition, the propagation of the radio waves is not limited by terrain, and therefore the long-distance communication on the ground is possible. In order to make up for the deficiency of submarine cable communication, the communications satellite is usually used for mobile communication. For example, a transportation such as a ship or a plane which is far away from the land may use the communications satellite when the wired communication is not available. Also, the communications satellite may be used for data transmission which has a relatively low requirement of real-time.

The satellite communication mainly refers to radio communication among respective earth stations or between the earth station and a spacecraft, in which signals are forwarded via the communications satellite. The satellite communication mainly includes satellite relay communication, satellite direct broadcast, satellite mobile communication and satellite fixed communication. The satellite relay communication is wireless communication in which signals are forwarded between the earth station and the spacecraft via the communications satellite. The satellite direct broadcast, the satellite mobile communication and the satellite fixed communication are each wireless communication in which signals are forwarded between the respective earth stations via the communications satellite. Each of these communications has advantages of large capacity, wide frequency band, large coverage, distance-independent cost, not being influenced by geological condition, flexibility, reliable and stable performance, wide applicability and the like. However, since the satellite is very far away from the ground, the satellite communication is applicable to only data transmission with a low requirement of real-time.

SUMMARY

A general summary of the present disclosure is provided here, rather than full disclosing of the whole scope or all features of the present disclosure.

The present disclosure relates to a user equipment, a satellite, an assistant device, a method and a storage medium in satellite communication, which enable data transmission satisfying requirements of transmission speed or reliability to be performed between the user and the satellite even if the transmission power constraint of the user equipment fails to satisfy the transmission power demand of the satellite communication.

According to an aspect of the present disclosure, a user equipment capable of performing satellite communication is provided. The user equipment includes one or more processing circuitries. The processing circuitry is configured to perform the operations of evaluating a transmission power demand of the user equipment to perform communication with a satellite, and assisting the user equipment, by an assistant device, to perform at least a part of the communication with the satellite when a transmission power constraint of the user equipment fails to satisfy the transmission power demand, wherein the processing circuitry is further configured to acquire, via the satellite, a communication mode to be switched to, wherein the processing circuitry sends to the satellite a notification indicating a necessity of switching a current communication mode, and the notification includes information indicating a necessity of switching to a communication mode satisfying the transmission power demand.

According to another aspect of the present disclosure, an assistant device for assisting a user equipment to perform communication with a satellite is provided. The assistant device includes a receiver configured to receive data which is to be sent to the satellite by the user equipment via the assistant device, and a transmitter configured to send the data to the satellite.

According to another aspect of the present disclosure, a method of performing satellite communication in a satellite communication system is provided. The method includes: evaluating, by a user equipment, a transmission power demand for performing communication with a satellite; and triggering switching to a candidate communication mode in which a transmission power constraint of the user equipment satisfies the transmission power demand, when the transmission power constraint of the user equipment fails to satisfy the transmission power demand.

According to another aspect of the present disclosure, a computer readable storage medium is provided. The computer readable storage medium includes executable computer instructions. The executable computer instructions cause a computer to perform the method described in the present disclosure when being executed by the computer.

With the user equipment, the satellite, the assistant device, the method and the storage medium according to the present disclosure, data transmission satisfying requirements of transmission speed or reliability can be performed between the user and the satellite, even if the transmission power constraint of the user equipment fails to satisfy the transmission power demand of the satellite.

More applicable fields will become apparent from the description provided herein. The description and specific examples in the summary are only schematic, and do not intend to limit the scope of the present disclosure.

BRIEF DESCRIPTION OF THE DRAWINGS

Drawings described herein show only schematic embodiments rather than all possible embodiments, and are not intended to limit the scope of the present disclosure. In the drawings.

Figure 1A:
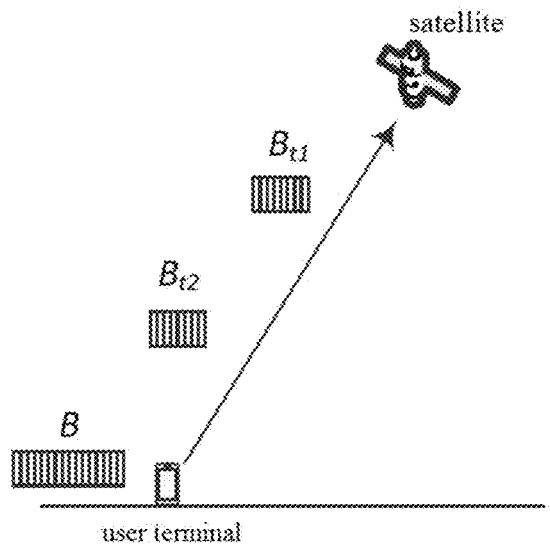
FIG. 1A shows a schematic diagram of transmitting of a user terminal with a decreased transmission speed in order to maintain satellite communication.

Although the present disclosure is easily subjected to various modifications and replacements, specific embodiments as examples are shown in the drawings and described in detail here. However, it should be understood that, the description of specific embodiments is not intended to limit the present disclosure. In contrast, the present disclosure is intended to cover all modifications, equivalents and replacements falling within the spirit and scope of the present disclosure. It should be noted that, corresponding reference numerals indicate corresponding components throughout several drawings.

DETAILED DESCRIPTION OF EMBODIMENTS

Examples of the present disclosure are fully disclosed with reference to the drawings. The description below is only schematic in essence, and is not intended to limit the present disclosure, application or usage.

Schematic embodiments are provided, so that the present disclosure will become thorough and fully convey the scope thereof to those skilled in the art. Many specific details such as examples of specific components, devices and methods are clarified here, to provide detailed understanding of embodiments of the present disclosure. It is apparent for those skilled in the art that, the schematic embodiments may be implemented by many different ways without using specific details, which should not be understood as limiting the scope of the present disclosure. In some schematic examples, well-known processes, structures and technologies are not described in detail.

The UE (user equipment) involved in the present disclosure includes but not limited to a terminal having a wireless communication function including satellite communication, such as a mobile terminal, a computer, and a vehicle mounted device. Further, depending on specific functions described, the UE involved in the present disclosure may be a UE itself or components thereof, for example a chip. In addition, the assistant device involved in the present disclosure is any device having a satellite communication function, includes but not limited to a base station, a satellite and other terminal. Similarly, a base station functioning as the assistant device may be, for example, an eNB (evolution Node Base station), a gNB (a base station in the fifth generation of communication system), or components of eNB or gNB, such as a chip.

In the satellite mobile communication system, a satellite is far away from ground, resulting in that the user terminal consumes greater power in communicating with the satellite than in communicating with the ground. A volume of the user terminal is limited, and a transmission power of the user terminal is generally limited. Therefore, a case that a calculated transmission power for satellite communication is greater than a maximum allowable transmission power of the user terminal may occur with a great probability. Even in the above case, it is required to ensure that data transmission satisfying a transmission speed or reliability expectation can be performed between the user and the satellite.

In a case that the transmission power required for satellite communication is greater than the maximum allowable transmission power of the user terminal, generally, a transmission power within a capability range of the current user equipment is selected for transmission, that is, a transmission power not exceeding the maximum allowable transmission power is selected for transmission. In this case, the user has to reduce the requirement on the transmission speed or reliability, and thus communication with a decreased transmission speed or a reduced transmission reliability can be performed between the user and the satellite.

Therefore, it is required to provide a technical solution, so that data transmission satisfying a transmission speed or reliability expectation can be performed between the user and the satellite, even if the transmission power constraint of the user equipment cannot satisfy the transmission power demand.

Figure 1B:
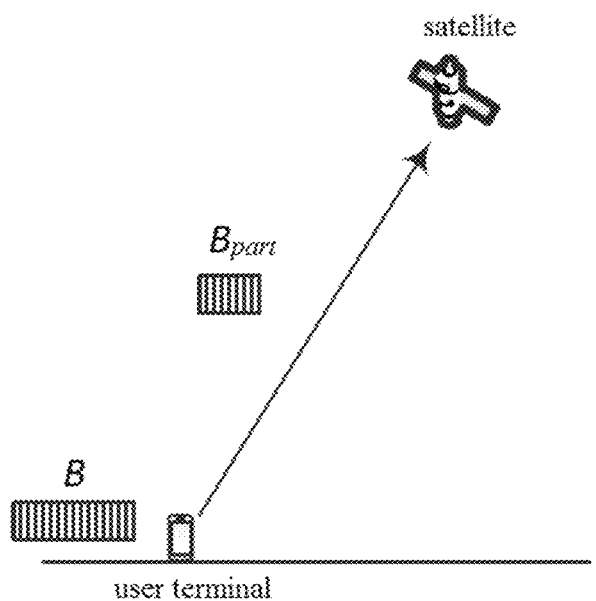
FIG. 1B shows a schematic diagram of transmitting of a user terminal with a reduced reliability in order to maintain satellite communication.

FIGS. 1A and 1B show solutions adopted in the conventional technology when a current data transmission capability of a user equipment cannot satisfy a transmission power demand, so as to maintain communication with a satellite by the user terminal.

FIG. 1A shows a schematic diagram of transmitting of a user terminal with a decreased transmission speed in order to maintain communication with a satellite.

The user equipment shown in FIG. 1A expects to communicate with the satellite at a predetermined fixed data speed. In order to maintain the data speed, the user equipment is required to have a transmission power adapting to the data speed. Therefore, the user equipment needs to calculate a transmission power adapting to continuous transmission of data at the data speed. If the current data transmission capability of the user equipment cannot satisfy the calculated transmission power demand, the required transmission power may be reduced as shown in FIG. 1A. As an example, in FIG. 1A, data B which is supposed to be transmitted in one transmission process (lasting for a fixed continuous time period) is divided into two parts and transmitted in two transmission processes. Apparently, reduction of the data speed increases the data transmission time, resulting in bad user experience. Particularly, the solution described above is not applicable to a scenario with a high delay requirement.

FIG. 1B shows a schematic diagram of transmitting with a reduced reliability by the user terminal in order to maintain satellite communication.

The user equipment shown in FIG. 1B expects to communicate with a satellite to transmit all data to be transmitted. Similar to the case shown in FIG. 1A, in order to transmit all data to be transmitted, the user equipment is required to have a transmission power for transmitting all data to be transmitted. Therefore, similarly, the user equipment is required to calculate a transmission power required for transmitting all data to be transmitted. When the current data transmission capability of the user equipment cannot satisfy the calculated transmission power demand, transmission may be performed with a reduced reliability, as shown in FIG. 1B. As an example, in FIG. 1B, only a part of data B to be transmitted is transmitted. Apparently, loss or discarding of data will influence the user experience (although a part of data may be lost in certain applications). Particularly, the solution described above is not applicable to the application scenario with a high requirement on data integrity.

Therefore, in the satellite communication, in a case that the current data transmission capability of the user equipment cannot satisfy the transmission power demand for satellite communication, the existing satellite communication solution has a lot of disadvantages.

Figure 2A:
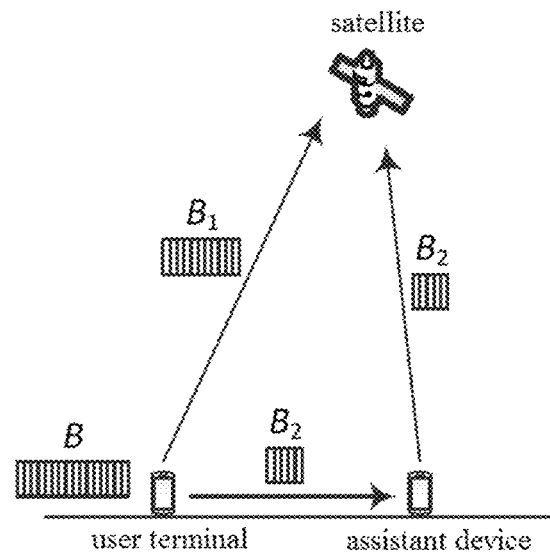
FIG. 2A shows a schematic diagram of performing satellite communication by a user equipment by means of an assistant device according to an embodiment of the present disclosure.

FIG. 2A shows a schematic diagram of performing satellite communication by a user equipment via an assistant device. As shown in FIG. 2, a set B of bits to be transmitted is divided into two parts, B1 and B2. Transmission of the bits in the set B2 may be beyond the transmission capability range of the user equipment due to power limitation. The user equipment transmits bits in the set B2 to the assistant device shown in the figure. Then, the user equipment and the assistant device respectively transmit the bits in the transmission sets B1 and B2 to the satellite, and the satellite receives the bits in the sets B1 and B2. Therefore, integrity of data can be guaranteed while ensuring that the communication between the user and the satellite meets the expected transmission speed. It should be noted that, this process may be understood as a switch process based on power. Therefore, it is unnecessary for the user terminal to transmit the bits with an upper limit of its capability range, and the bits may be configured according to demand. For example, it is possible to transmit all bits to the satellite by the assistant device (that is, the set B1 is empty).

Figure 2B:
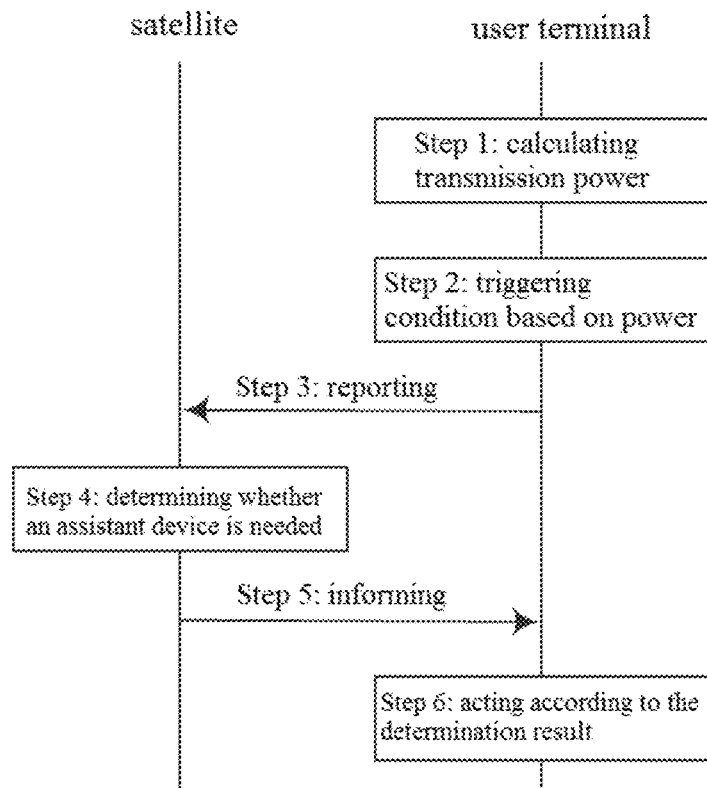
FIG. 2B shows a signaling flowchart of communication between a satellite and a user equipment according to an embodiment of the present disclosure.

FIG. 2B shows a signaling flowchart of communication between a satellite and a user equipment according to an embodiment of the present disclosure.

In step 1 of FIG. 2B, the user equipment calculates a transmission power demand for transmitting data to be transmitted. For those skilled in the art, in a case of capable of obtaining or having obtained related parameters of the satellite and the user equipment, the transmission power required, i.e., the transmission power demand, for transmitting the data to be transmitted can be calculated. The detailed process of calculating is not described in detail here.

Subsequently, in step 2 of FIG. 2B, the user equipment determines whether a condition for triggering a candidate communication mode is satisfied according to the transmission power demand calculated in step 1. In a case that transmission power constraint of the user equipment cannot satisfy the transmission power demand, switching is triggered to switch to a candidate communication mode in which the transmission power constraint satisfies the transmission power demand.

According to an embodiment of the present disclosure, the transmission power constraint of the user equipment is a preset threshold. In this embodiment, it is determined whether the required transmission power is excessive by comparing the required transmission power with the preset threshold, without considering the transmission capability of the user equipment. Specifically, if P_calculate>Thresh is satisfied, it is determined that the required transmission power is excessive. Then, the user equipment triggers switching to a candidate communication mode in which the transmission power constraint satisfies the transmission power demand. P_calculate herein indicates the required transmission power calculated by the user equipment, and Thresh indicates the preset threshold.

According to an embodiment of the present disclosure, communication hysteresis is taken into consideration as a part of the transmission power constrain. That is, the transmission power constraint of the user equipment is a sum of the preset threshold and the hysteresis. In the embodiment, it is determined whether the required transmission power is excessive in consideration of the hysteresis. That is, it is determined whether the required transmission power is excessive by comparing the required transmission power with the sum of the preset threshold and the hysteresis, to avoid a deviation due to the hysteresis. Specifically, if P_calculate>Thresh+Hys is satisfied, it is determined that the required transmission power is excessive. Then, the user equipment triggers switching to a candidate communication mode in which the transmission power constraint satisfies the transmission power demand. P_calculate herein indicates the required transmission power calculated by the user equipment, Thresh indicates the preset threshold, and Hys indicates hysteresis.

According to an embodiment of the present disclosure, a maximum allowable transmission power of the user equipment is taken into consideration as a part of the transmission power constraint. That is, the transmission power constraint of the user equipment is a sum of the preset threshold and the maximum allowable transmission power of the user equipment. In this embodiment, it is determined whether the required transmission power is much beyond the maximum allowable transmission power of the user equipment in consideration of the maximum allowable transmission power of the user equipment. That is, it is determined whether the required transmission power is excessive by comparing the required transmission power with the sum of the preset threshold and the maximum allowable transmission power of the user equipment. Specifically, if P_calculate>Thresh+P_max is satisfied, it is determined that the required transmission power is much beyond the maximum allowable transmission power of the user equipment. Then, the user equipment triggers switching to a candidate communication mode in which the transmission power constraint satisfies the transmission power demand. P_calculate herein indicates the required transmission power calculated by the user equipment, Thresh indicates a preset threshold, and P_max indicates a maximum allowable transmission power of the user equipment.

According to another embodiment of the present disclosure, the transmission power constraint of the user equipment is a sum of the maximum allowable transmission power of the user equipment, the communication hysteresis and the preset threshold. Specifically, if P_calculate>Thresh+P_max+Hys is satisfied, that is, in a case of considering the communication hysteresis, it is determined that the required transmission power is much beyond the maximum allowable transmission power of the user equipment. Then, the user equipment triggers switching to a candidate communication mode in which the transmission power constraint satisfies the transmission power demand. P_calculate herein indicates the required transmission power calculated by the user equipment, Thresh indicates the preset threshold, P_max indicates the maximum allowable transmission power of the user equipment, and Hys indicates the hysteresis.

Elements included in the transmission power constraint of the user equipment are not limited to the elements described above, any element which may influence the satellite communication or may be taken into account for various requirements, may function as elements of the transmission power constraint of the user equipment, and the same determination is performed as described in the above embodiments. That is, in a case that the transmission power constraint of the user equipment cannot satisfy the transmission power demand, switching is triggered to switch to a candidate communication mode in which the transmission power constraint satisfies the transmission power demand.

Therefore, in the above embodiments, in a case that the transmission power constraint of the user equipment cannot satisfy the transmission power demand, the user equipment triggers switching to a candidate communication mode in which the transmission power constraint satisfies the transmission power demand. In this way, the user equipment can select the determination manner, and thereby the user equipment can trigger switching of the communication mode by itself.

In step 3, if it is determined that the triggering condition in step 2 is satisfied, the user equipment informs the satellite of the determination result. The informing may be performed in one of the following manners: (1) the existing Power Headroom (PH) includes six bits which can only indicate positive numbers; the number of bits in the PH field remains unchanged, but the six bits are redefined so that they can indicate negative power; (2) definition of the PH is extended, so that at least one bit is added for indicating a sign of the carried number, and the remaining bits indicate an absolute value of the carried number; if the bit for indicating the sign is 0, it is indicated that the carried number is a positive number; if the bit for indicating the sign is 1, it is indicated that the carried number is a negative number; it is also possible to define the bit for indicating the sign in a reverse way, that is, if the bit for indicating the sign is 1, it is indicated that the carried number is a positive number; if the bit for indicating the sign is 0, it is indicated that the carried number is a negative number; (3) a new field is introduced into a UCI field of the physical layer, the new field may have only two values, noted as V0 and V1. For example, V0 may be all "0", and V1 may be all "1". Other encoding methods are also possible. If the value of the new field is V0, it is indicated that the calculated transmission power of the user fails to satisfy the triggering condition, and if the value of the new field is V1, it is indicated that the calculated transmission power of the user satisfies the triggering condition.

Next, in step 4, after the satellite receives the report sent by the user equipment in one of the above manners, the satellite determines whether it is required to search for an assistant device to assist the user equipment to transmit data.

In step 5, the satellite informs the user of the determination result. Instead, the satellite provides the determination result to the assistant device such as a base station, and the base station forwards the determination result to the user. In step 6, the user equipment performs actions according to the received determination result.

Figure 2C:
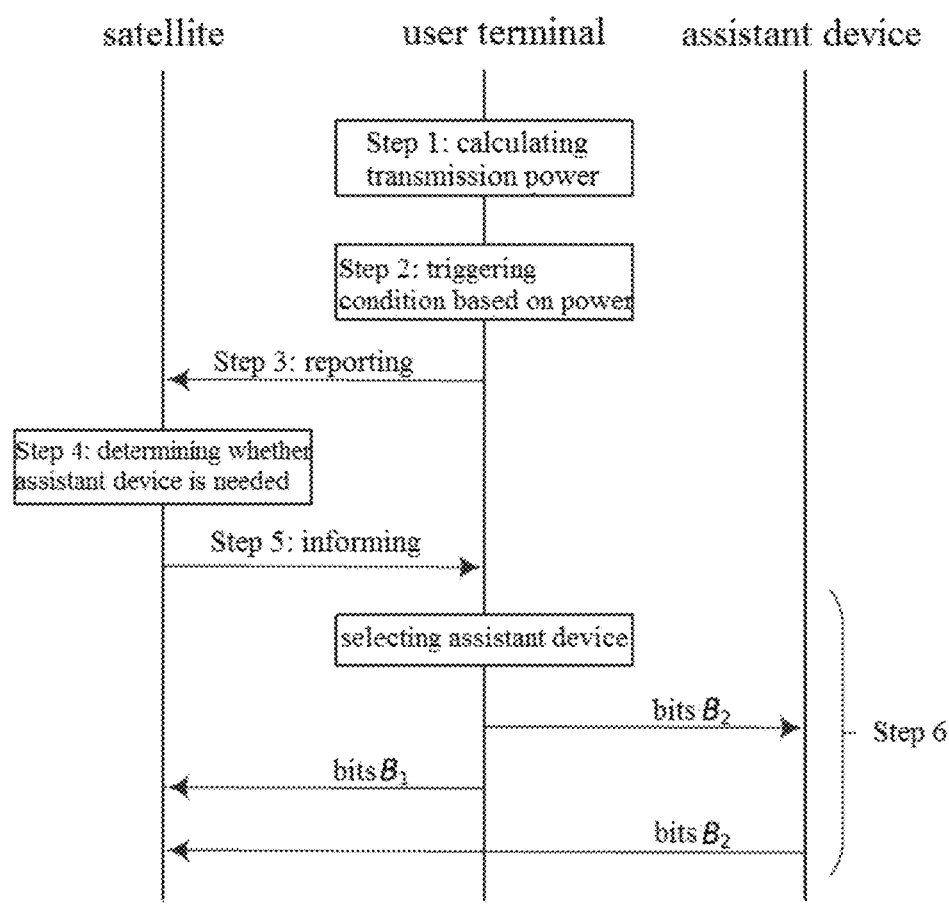
FIG. 2C shows a signaling flowchart of communication between a satellite, a user equipment and an assistant device according to an embodiment of the present disclosure.

FIG. 2C shows a signaling flowchart of communication between a satellite, a user equipment and an assistant device according to an embodiment of the present disclosure.

Compared with FIG. 2B, FIG. 2C further illustrates actions performed according to the determination result in step 6 of FIG. 2B. In step 6 of FIG. 2C, the user equipment selects the assistant device. The satellite configures so that the user searches for an assistant device, or the user determines an assistant device from a white list. In order to cause the current satellite to determine the white list of the assistant devices, information such as an orbit, a speed, a capacity and a power is interacted between adjacent satellites via an interface such as X2, and the information is provided to the user through MIB/SIB/RRC and so on. If the user equipment is configured to search for an assistant device by itself, the user equipment searches for the assistant device for assisting data transmission according to an algorithm, and allocates to the assistant device the bits that are beyond the transmission capability range of the user equipment due to its power limitation. Then, the user equipment and the assistant device transmit data to the satellite. Specifically, FIG. 2A shows a flowchart in which three entities, a satellite, a user terminal and an assistant device are involved. First, the user terminal determines an assistant device. Second, the user terminal transmits the bits that are beyond the transmission capability range (that is, bits in the set B2) to the assistant device. Third, the user terminal transmits the bits within its capability range or the bits that need to be transmitted by itself (that is, bits in the set B1) to the satellite, in which case the set B1 may be empty. Fourth, the assistant device transmits the allocated bits (that is, bits in the set B2) to the satellite.

Figure 2D:
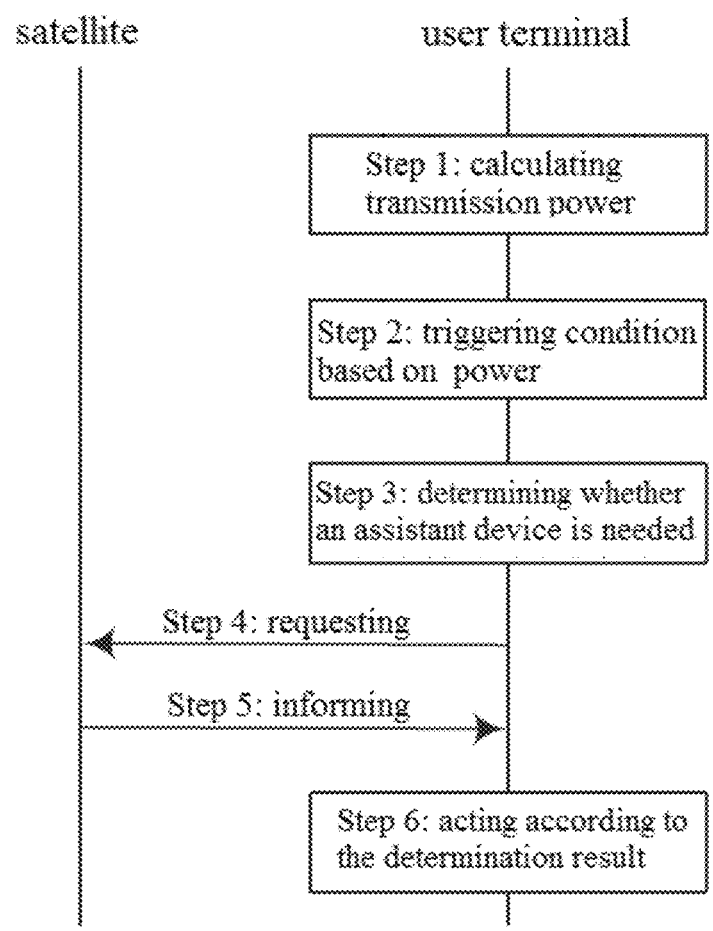
FIG. 2D shows a signaling flowchart of communication between a satellite and a user equipment according to an embodiment of the present disclosure.

FIG. 2D shows a signaling flowchart of communication between the satellite and the user equipment according to another embodiment of the present disclosure, as an alternative of the embodiment shown in FIG. 2B. Specifically, in step 1, the user equipment calculates a corresponding transmission power for transmitting data. In step 2, the user equipment checks whether the calculated transmission power satisfies the triggering condition.

According to another embodiment of the present disclosure, the transmission power of the user equipment is a preset threshold. In this embodiment, it may be determined whether the required transmission power is excessive by comparing the required transmission power with the preset threshold without considering the transmission capability of the user equipment. Specifically, if P_calculate>Thresh is satisfied, it is determined that the required transmission power is excessive. Then, the user equipment triggers switching to a candidate communication mode in which the transmission power constraint satisfies the transmission power demand. P_calculate herein indicates the required transmission power calculated by the user equipment, and Thresh indicates a preset threshold.

According to an embodiment of the present disclosure, communication hysteresis is taken into consideration as a part of the transmission power constraint. That is, the transmission power constraint of the user equipment is a sum of the preset threshold and the hysteresis. In this embodiment, in a case of considering the hysteresis, it is determined whether the required transmission power is excessive. That is, it is determined whether the required transmission power is excessive by comparing the required transmission power with a sum of the preset threshold and the hysteresis, to avoid a deviation due to hysteresis. Specifically, if P_calculate>Thresh+Hys is satisfied, it is determined that the required transmission power is excessive. Then, the user equipment triggers switching to a candidate communication mode in which the transmission power constraint satisfies the transmission power demand. P_calculate herein indicates the required transmission power calculated by the user equipment, Thresh indicates the preset threshold, and Hys indicates the hysteresis.

According to an embodiment of the present disclosure, a maximum allowable transmission power of the user equipment is taken into consideration as a part of the transmission power constraint. That is, the transmission power constraint of the user equipment is a sum of the preset threshold and the maximum allowable transmission power of the user equipment. In this embodiment, it is determined whether the required transmission power exceeds the maximum allowable transmission power of the user equipment. That is, it is determined whether the required transmission power is excessive by comparing the required transmission power with the sum of the preset threshold and the maximum allowable transmission power of the user equipment. Specifically, if P_calculate>Thresh+P_max is satisfied, it is determined that the required transmission power is much beyond the maximum allowable transmission power of the user equipment. Then, the user equipment triggers switching to a candidate communication mode in which the transmission power constraint satisfies the transmission power demand. P_calculate herein indicates the required transmission power calculated by the user equipment, Thresh indicates a preset threshold, and P_max indicates the maximum allowable transmission power of the user equipment.

According to another embodiment of the present disclosure, the transmission power constraint of the user equipment is a sum of the maximum allowable transmission power of the user equipment, the communication hysteresis and the preset threshold. Specifically, if P_calculate>Thresh+P_max+Hys is satisfied, that is, in a case of considering the communication hysteresis, it is determined that the required transmission power is much beyond the maximum allowable transmission power of the user equipment. Then, the user equipment triggers switching to a candidate communication mode in which the transmission power constraint satisfies the transmission power demand. P_calculate herein indicates the required transmission power calculated by the user equipment, Thresh indicates a preset threshold, P_max indicates the maximum allowable transmission power of the user equipment, and Hys indicates the hysteresis.

Elements included in the transmission power constraint of the user equipment are not limited to the elements described above, any element which may influence the satellite communication or may be taken into account for various requirements, may function as elements of the transmission power constraint of the user equipment, and the same determination is performed as described in the above embodiments. That is, in a case that the transmission power constraint of the user equipment cannot satisfy the transmission power demand, switching is triggered to switch to a candidate communication mode in which the transmission power constraint satisfies the transmission power demand.

Therefore, in the above embodiments, in a case that the transmission power constraint of the user equipment cannot satisfy the transmission power demand, the user equipment triggers switching to a candidate communication mode in which the transmission power constraint satisfies the transmission power demand.

In step 3, if the triggering condition is satisfied, the user determines a white list of possible assistant devices, or the satellite configures the white list of assistant devices for the user through RRC signaling. Then, the user equipment searches for an assistant device from the white list of assistant devices.

In step 4, the user equipment requests the satellite to allocate wireless resources and transmission powers of the satellite for the user equipment and the assistant device.

In step 5, the satellite provides the wireless resources and transmission powers of the satellite allocated to the user and the assistant device to the user and the assistant device.

In step 6, the user equipment and the assistant device together transmit data to the satellite according to the resource allocation result.

As described above, FIG. 2A to FIG. 2D show various embodiments in which the user equipment maintains communication having the expected speed and reliability with the satellite by means of assisting.

In addition to the manner of transmitting data by means of the assistant device, the inventor has recognized that accessing the original satellite or another satellite facilitating the communication after waiting for a certain delay period is possible.

Figure 3A:
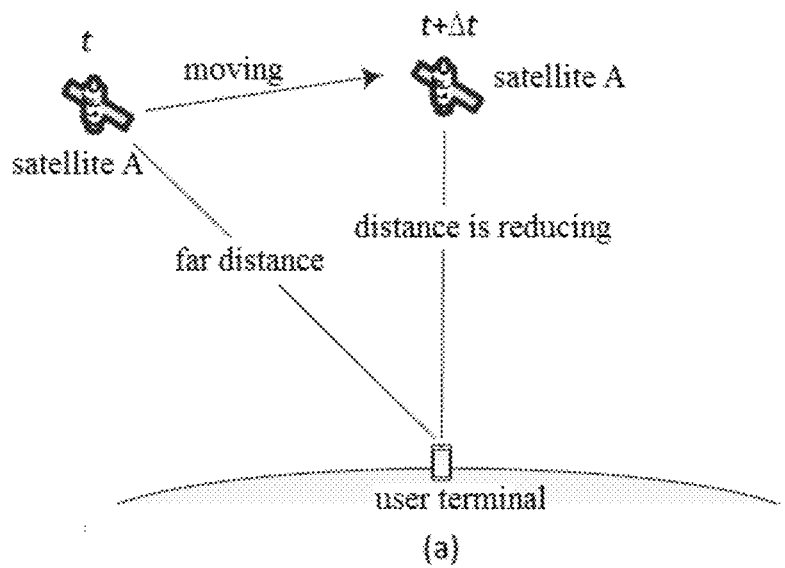
FIG. 3A shows a schematic diagram of accessing to a satellite again by a user equipment after waiting for a delay period according to an embodiment of the present disclosure.
Figure 3A:
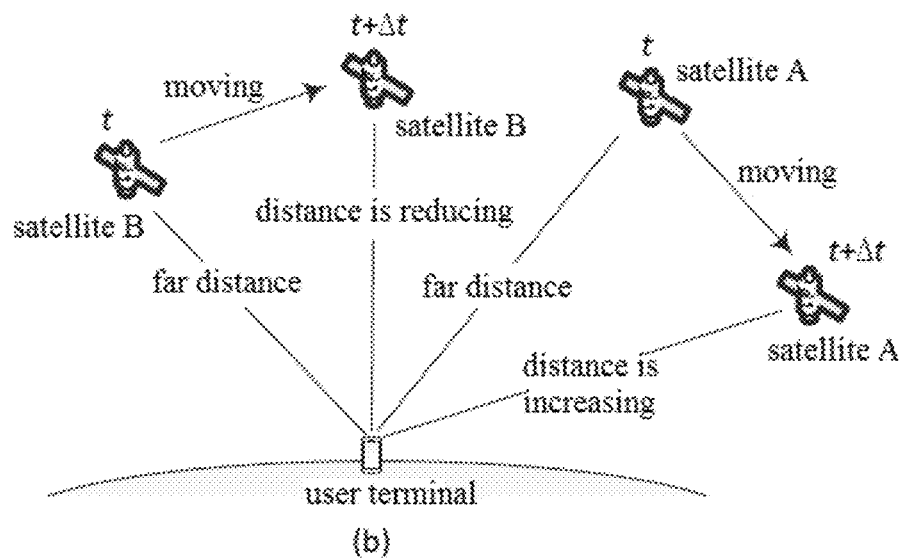

FIG. 3A shows a schematic diagram of accessing to a satellite again by a user equipment after waiting for a delay period according to an embodiment of the present disclosure.

It is assumed that the user is communicating with the satellite, and the satellite A transmits a calculated transmission power to the user at time t. In addition, since the satellite A is far away from the user, resulting in that the transmission power demand exceeds the transmission power constraint of the user equipment.

Case 1: as shown in (a) of FIG. 3A, the satellite A has not reached the position above the user at time t. With movement of the satellite, the satellite A reaches the position above the head of the user at time t+Δt. At this time, the satellite A is nearest to the user, so that the satellite A can satisfy the requirement of transmission speed and reliability within the transmission power constraint range of the user equipment. Therefore, the satellite A instructs the user to wait for time Δt, and then the satellite A reconfigures the transmission power for the user.

Case 2: as shown in (b) of FIG. 3A, the satellite A has passed the position above the user at time t. With movement of the satellite, the satellite A is getting farther and farther away from the user. Whereas, at time t+Δt, a next satellite B reaches the position above the head of the user. At this time, the satellite B is nearest to the user, so that the satellite B can satisfy the requirements of transmission speed and reliability within the transmission power constraint range of the user equipment. Therefore, the satellite A may instruct the user to wait for time Δt, and then the satellite B reconfigures the transmission power for the user.

Figure 3B:
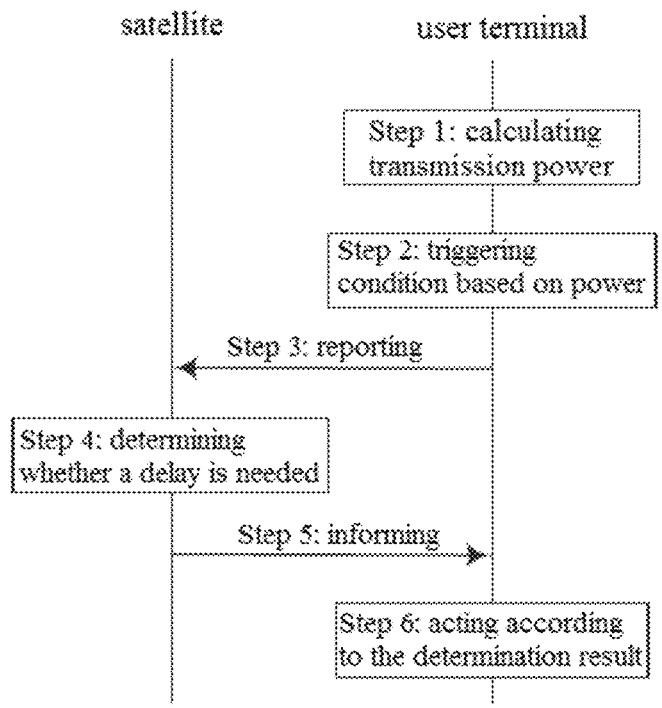
FIG. 3B shows a signaling flowchart of accessing to a satellite again by a user equipment after waiting for a delay period according to an embodiment of the present disclosure.

FIG. 3B shows a signaling flowchart of accessing to a satellite again by a user equipment after waiting for a delay period according to an embodiment of the present disclosure.

Similar to step 1 in FIG. 2B, in step 1 of FIG. 3B, first, the user equipment calculates a corresponding transmission power demand for transmitting data to be transmitted.

Next, similar to step 2 in FIG. 2B, in step 2 of FIG. 3B, the user equipment determines whether a condition for triggering a candidate communication mode is satisfied according to the transmission power demand calculated in step 1. In a case that the transmission power constraint of the user equipment cannot satisfy the transmission power demand, switching is triggered to switch to a candidate communication mode in which the transmission power constraint satisfies the transmission power demand.

According to an embodiment of the present disclosure, the transmission power constraint of the user equipment is the preset threshold. In this embodiment, it is determined whether the required transmission power is excessive by comparing the required transmission power with the preset threshold without considering the transmission capability of the user equipment. Specifically, if P_calculate>Thresh is satisfied, it is determined that the required transmission power is excessive. Then, the user equipment triggers switching to a candidate communication mode in which the transmission power constraint satisfies the transmission power demand. P_calculate herein indicates the required transmission power calculated by the user equipment, and Thresh indicates the preset threshold.

According to an embodiment of the present disclosure, communication hysteresis is taken into consideration as a part of the transmission power constrain. That is, the transmission power constraint of the user equipment is a sum of the preset threshold and the hysteresis. In this embodiment, it is determined whether the required transmission power is excessive in consideration of the hysteresis. That is, it is determined whether the required transmission power is excessive by comparing the required transmission power with the sum of the preset threshold and the hysteresis, to avoid a deviation due to the hysteresis. Specifically, if P_calculate>Thresh+Hys is satisfied, it is determined that the required transmission power is excessive. Then, the user equipment triggers switching to a candidate communication mode in which the transmission power constraint satisfies the transmission power demand. P_calculate herein indicates the required transmission power calculated by the user equipment, Thresh indicates the preset threshold, and Hys indicates hysteresis.

According to an embodiment of the present disclosure, a maximum allowable transmission power of the user equipment is taken into consideration as a part of the transmission power constraint. That is, the transmission power constraint of the user equipment is a sum of the preset threshold and the maximum allowable transmission power of the user equipment. In this embodiment, it is determined whether the required transmission power is much beyond the maximum allowable transmission power of the user equipment in consideration of the maximum allowable transmission power of the user equipment. That is, it is determined whether the required transmission power is excessive by comparing the required transmission power with the sum of the preset threshold and the maximum allowable transmission power of the user equipment. Specifically, if P_calculate>Thresh+P_max is satisfied, it is determined that the required transmission power is much beyond the maximum allowable transmission power of the user equipment. Then, the user equipment triggers switching to a candidate communication mode in which the transmission power constraint meets the transmission power demand. P_calculate herein indicates the required transmission power calculated by the user equipment, Thresh indicates a preset threshold, and P_max indicates the maximum allowable transmission power of the user equipment.

According to another embodiment of the present disclosure, the transmission power constraint of the user equipment is a sum of the maximum allowable transmission power of the user equipment, the communication hysteresis and the preset threshold. Specifically, if P_calculate>Thresh+P_max+Hys is satisfied, that is, in a case of considering the communication hysteresis, it is determined that the required transmission power is much beyond the maximum allowable transmission power of the user equipment. Then, the user equipment triggers switching to a candidate communication mode in which the transmission power constraint meets the transmission power demand. P_calculate herein indicates the required transmission power calculated by the user equipment, Thresh indicates the preset threshold, P_max indicates the maximum allowable transmission power of the user equipment, and Hys indicates the hysteresis.

Elements included in the transmission power constraint of the user equipment are not limited to the elements described above, any element which may influence the satellite communication or may be taken into account for various requirements, may function as elements of the transmission power constraint of the user equipment, and the same determination is performed as described in the above embodiments. That is, in a case that the transmission power constraint of the user equipment cannot satisfy the transmission power demand, switching is triggered to switch to a candidate communication mode in which the transmission power constraint satisfies the transmission power demand.

Therefore, in the above embodiments, in a case that the transmission power constraint of the user equipment cannot satisfy the transmission power demand, the user equipment triggers switching to a candidate communication mode in which the transmission power constraint satisfies the transmission power demand.

Different from step 3 in FIG. 2B, in step 3 of FIG. 3B, if the triggering condition is satisfied, the power may be transmitted to the satellite in one of the following manners: (1) the existing Power Headroom (PH) includes six bits which indicate only positive numbers; the number of bits of the PH field remains unchanged, but the six bits are redefined so that they can indicate negative powers; and (2) definition of the PH is extended, so that at least one bit is added for indicating a sign of the carried number, and the remaining bits indicate an absolute value of the carried number. In one of the above manners, the corresponding negative value of power may be sent to the satellite through the extended Power Headroom control element (CE) field of a MAC layer.

In step 4, the satellite determines whether it is necessary for the user to retransmit after waiting for a certain delay period.

The delay period for which the user equipment waits and the white list of satellites based on which the user equipment performs accessing again may be obtained in the following manner. The current satellite, by using information interacted between adjacent satellites such as an orbit, a speed, a capacity and a power, calculates the delay period for which the user equipment waits and the white list of satellites to which the user equipment may access. After calculating the delay period for which the user equipment waits, the current satellite sends the calculated delay period to the user equipment, and provides the white list of satellites to the user equipment through MIB/SIB/RRC. Alternatively, the satellite may provide the calculated delay period and the white list of satellites to the assistant device such as a base station, and then the assistant device forwards the delay period and the white list of satellites to the user. Specifically, the satellite may send the delay period to the user equipment at least in one of the following manners: (1) defining a new MAC layer CE, which means the user performs transmission after waiting for a period of time, the period is indicated by a combination of bits in the CE field, and a maximum waiting period that can be indicated is at least a half of a visible period of the satellite; for example, if the visible period of the satellite is ten minutes, the maximum waiting period of the CE is at least five minutes; and (2) configuring through RRC signaling. For example, the system may provide a list of possible waiting periods to the user through broadcasting, and then the user selects according to its channel condition. If the channel condition is good, the user selects a short waiting period, and if the channel condition is poor, the user selects a long waiting period. In step 6, if it is configured to wait for a delay period, the user waits for the delay period, and then selects one satellite in the white list to retransmit data. Alternatively, the satellite may be selected by the base station in the white list, thereby reducing power consumption of the user equipment.

Figure 3C:
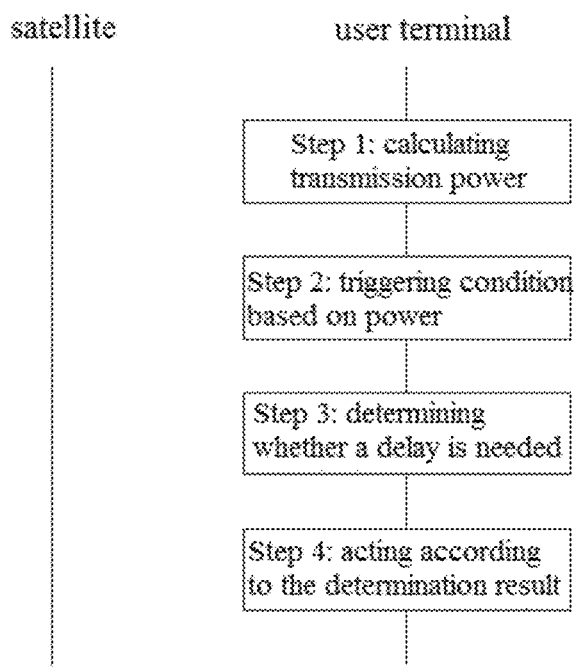
FIG. 3C shows a signaling flowchart of accessing to a satellite again by a user equipment after waiting for a delay period according to another embodiment of the present disclosure.

FIG. 3C shows a signaling flowchart of accessing the satellite again after waiting for the delay period by the user equipment according to another embodiment of the present disclosure. As an alternative of the embodiment shown in FIG. 3B, in step 1, the user equipment calculates a corresponding transmission power for transmitting data.

Next, similar to step 2 in FIG. 2B, in step 2 of FIG. 3C, the user equipment determines whether a condition for triggering the candidate communication mode is satisfied according to the transmission power demand calculated in step 1. In a case that the transmission power constraint of the user equipment cannot satisfy the transmission power demand, switching is triggered to switch to a candidate communication mode in which the transmission power constraint satisfies the transmission power demand.

According to an embodiment of the present disclosure, the transmission power constraint of the user equipment is the preset threshold. In this embodiment, it is determined whether the required transmission power is excessive by comparing the required transmission power with the preset threshold without considering the transmission capability of the user equipment. Specifically, if $P\_calculate > Thresh$ is satisfied, it is determined that the required transmission power is excessive. Then, the user equipment triggers switching to a candidate communication mode in which the transmission power constraint satisfies the transmission power demand. P_calculate herein indicates the required transmission power calculated by the user equipment, and Thresh indicates the preset threshold.

According to an embodiment of the present disclosure, communication hysteresis is taken into consideration as a part of the transmission power constrain. That is, the transmission power constraint of the user equipment is a sum of the preset threshold and the hysteresis. In the embodiment, it is determined whether the required transmission power is excessive in consideration of the hysteresis. That is, it is determined whether the required transmission power is excessive by comparing the required transmission power with the sum of the preset threshold and the hysteresis, to avoid a deviation due to the hysteresis. Specifically, if $P\_calculate > Thresh + Hys$ is satisfied, it is determined that the required transmission power is excessive. Then, the user equipment triggers switching to a candidate communication mode in which the transmission power constraint satisfies the transmission power demand. P_calculate herein indicates the required transmission power calculated by the user equipment, Thresh indicates the preset threshold, and Hys indicates hysteresis.

According to an embodiment of the present disclosure, a maximum allowable transmission power of the user equipment functions is taken into consideration as a part of the transmission power constraint. That is, the transmission power constraint of the user equipment is a sum of the preset threshold and the maximum allowable transmission power of the user equipment. In this embodiment, it is determined whether the required transmission power is much beyond the maximum allowable transmission power in consideration of the maximum allowable transmission power of the user equipment. That is, it is determined whether the required transmission power is excessive by comparing the required transmission power with the sum of the preset threshold and the maximum allowable transmission power of the user equipment. Specifically, if $P\_calculate > Thresh + P\_max$ is satisfied, it is determined that the required transmission power is much beyond the maximum allowable transmission power of the user equipment. Then, the user equipment triggers switching to a candidate communication mode in which the transmission power constraint meets the transmission power demand. P_calculate herein indicates the required transmission power calculated by the user equipment, Thresh indicates a preset threshold, and P_max indicates a maximum allowable transmission power of the user equipment.

According to another embodiment of the present disclosure, the transmission power constraint of the user equipment is a sum of the maximum allowable transmission power of the user equipment, the communication hysteresis and the preset threshold. Specifically, if P_calculate>Thresh+P_max+Hys is satisfied, that is, in a case of considering the communication hysteresis, it is determined that the required transmission power is much beyond the maximum allowable transmission power of the user equipment. Then, the user equipment triggers switching to a candidate communication mode in which the transmission power constraint meets the transmission power demand. P_calculate herein indicates the required transmission power calculated by the user equipment, Thresh indicates the preset threshold, P_max indicates the maximum allowable transmission power of the user equipment, and Hys indicates the hysteresis.

Elements included in the transmission power constraint of the user equipment are not limited to the elements described above, any element which may influence the satellite communication or may be taken into account for various requirements, may function as elements of the transmission power constraint of the user equipment, and the same determination is performed as described in the above embodiments. That is, in a case that the transmission power constraint of the user equipment cannot satisfy the transmission power demand, switching is triggered to switch to a candidate communication mode in which the transmission power constraint satisfies the transmission power demand.

Therefore, in the above embodiments, in a case that the transmission power constraint of the user equipment cannot satisfy the transmission power demand, the user equipment triggers switching to a candidate communication mode in which the transmission power constraint satisfies the transmission power demand.

In step 3, if the triggering condition is satisfied, the user determines the delay waiting period and the white list of satellites. In step 4, the user waits for the determined delay period, and then selects one satellite from the white list of satellites to retransmit data. In this embodiment, the white list of satellites may be determined and sent to the user equipment by the satellite. Alternatively, the base station may select the satellite from the white list of satellites, thereby reducing power consumption of the user.

Figure 4:
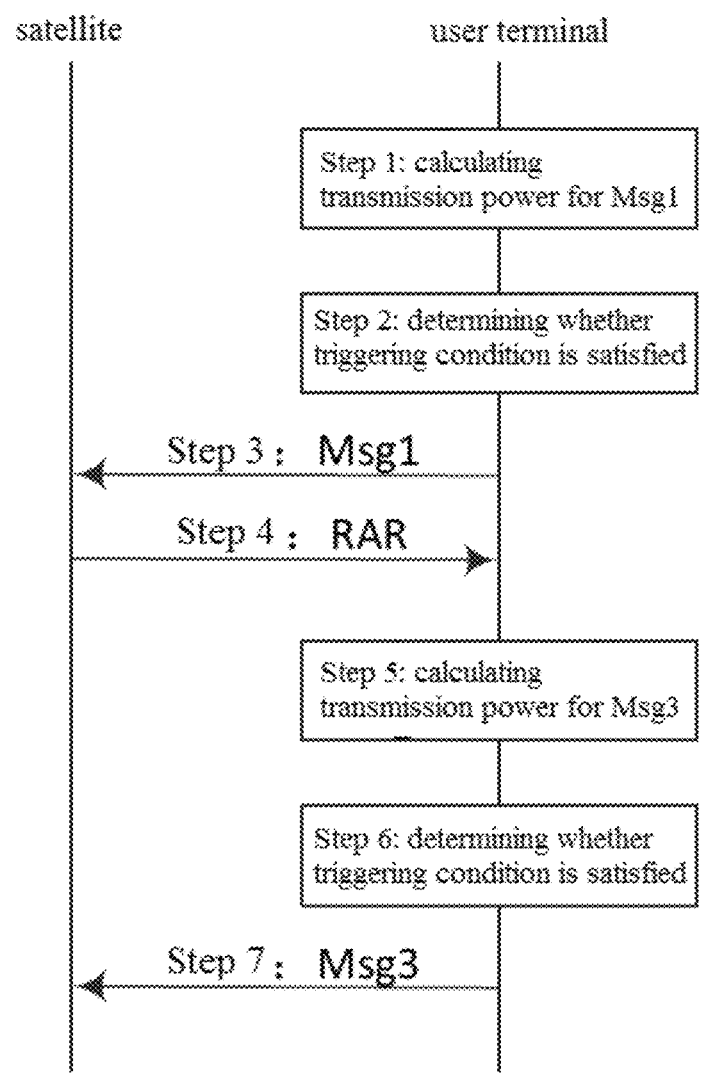
FIG. 4 shows a signaling flowchart of a random access process according to an embodiment of the present disclosure.

FIG. 4 shows a signaling flowchart of a random access process according to an embodiment of the present disclosure.

In this embodiment, during a random access process, if the transmission power constraint cannot satisfy the transmission power demand, the user equipment may process according to flows shown in the embodiment.

In step 1, the user equipment calculates a corresponding transmission power for transmitting Msg1 in a random access process.

In step 2, the user equipment checks whether the calculated transmission power for Msg1 satisfies the triggering condition. If the triggering condition is satisfied, the user may determine to access again or reselect one satellite from the white list of satellites for accessing.

In step 3, the user transmits Msg1.

In step 4, the user receives RAR (Random Access Response).

In step 5, the user calculates a corresponding transmission power for transmitting Msg3.

In step 6, the user checks whether the calculated transmission power for Msg3 satisfies the triggering condition. If the triggering condition is satisfied, the user may determine to access again, or select one satellite from the white list of satellites for accessing.

In step 7, the user transmits Msg3.

It should be noted that, the triggering condition in the embodiment of FIG. 4 is the same as the triggering condition in the previous embodiment. The white list of the satellites may be determined by the user equipment, or may be determined and sent to the user equipment by the satellite.

According to the various embodiments of the present disclosure, in a case that the transmission power constraint of the user equipment cannot satisfy the transmission power demand, the user equipment sends a report of communication failure.

Figure 5:
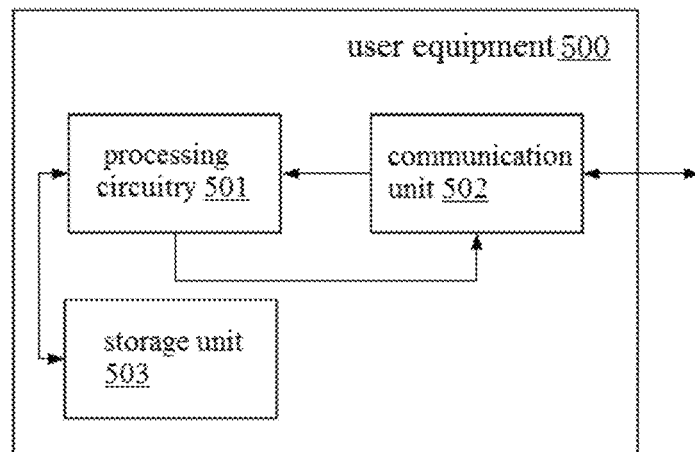
FIG. 5 shows a structural block diagram of a user equipment according to an embodiment of the present disclosure.

FIG. 5 shows a schematic structural diagram of a user equipment according to an embodiment of the present disclosure. As shown in FIG. 5, a user equipment 500 may include a processing circuitry 501. It should be noted that, the user equipment 500 may include one or more processing circuitries 501. In addition, the user equipment 500 further includes a communication unit 502 and a storage unit 503. The storage unit 503 is configured to store a white list of assistant devices and/or a white list of satellite devices. In addition, the user equipment 500 may include other circuitry.

Further, the processing circuit 501 may include various discrete functional units to perform different functions and/ or operations. It should be noted that, the functional units may be physical entities or logical entities, and units with different names may be implemented by the same physical entity.

The processing circuit 501 is configured to at least perform one of the following operations: evaluating a transmission power demand of the user equipment to perform communication with a satellite; triggering switching to a candidate communication mode in which a transmission power constraint satisfies the transmission power demand; obtaining, via the satellite, a communication mode to be switched to; automatically determining a communication mode to be switched to; selecting an assistant device in a white list of assistant devices; receiving a list of assistant devices; selecting a satellite in a list of satellites for access; receiving a delay period from the satellite; generating the list of satellite; receiving the list of satellites from the satellite; and transmitting a report of communication failure in a case that the transmission power constraint of the user equipment cannot satisfy the transmission power demand.

Figure 6:
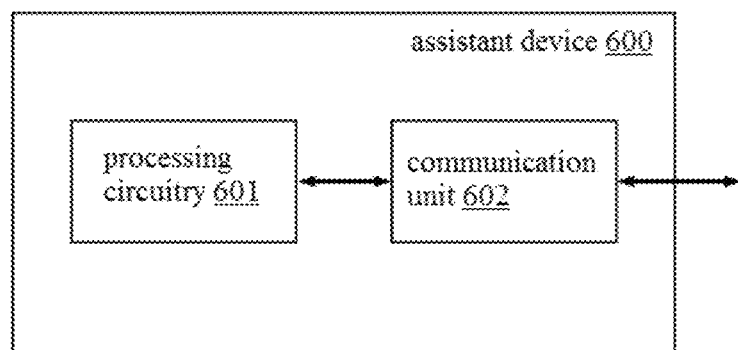
FIG. 6 shows a structural block diagram of an assistant device according to an embodiment of the present disclosure.

The communication unit 502 is configured to perform all operations related to the communication, such as all communication in the satellite communication and all communication between the user equipment and the assistant device. FIG. 6 shows a schematic structural diagram of an assistant device according to an embodiment of the present disclosure. As shown in FIG. 6, an assistant device 600 may include a processing circuitry 601. It should be noted that, the assistant device 600 may include one or more processing circuitries 601. In addition, the assistant device 600 further includes a communication unit 602. The communication unit 602 is configured to perform all operations related to the communication, such as all communication between the assistant device and the satellite and all communication between the assistant device and the user equipment. In addition, the assistant device 600 may include other circuitry. The communication unit 602 may include a receiver configured to receive data to be sent to the satellite by the user equipment via the assistant device, and a transmitter configured to transmit data to the satellite.

The processing circuit 601 is configured to at least perform one of the following operations: assisting the user equipment to evaluate a transmission power demand to perform communication with the satellite; assisting the user equipment to obtain data to be transmitted; assisting the user equipment to receive a white list of satellites; assisting the user equipment to select a satellite from the white list of satellites; and assisting the user equipment to receive the delay period from the satellite.

Figure 7:
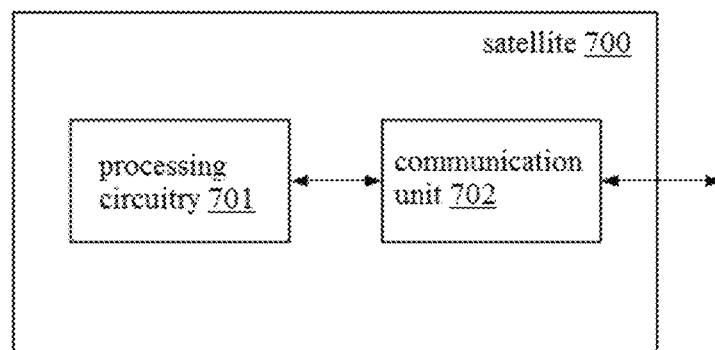
FIG. 7 shows a structural block diagram of a satellite according to an embodiment of the present disclosure.

FIG. 7 shows a schematic structural diagram of a satellite according to an embodiment of the present disclosure. As shown in FIG. 7, a satellite 700 may include a processing circuitry 701. It should be noted that, the satellite 700 may include one or more processing circuitries 701. In addition, the satellite 700 further includes a communication unit 702. The communication unit 702 is configured to perform all operations related to the communication, such as all communications between the satellite and the assistant device and all communications between the satellite and the user equipment. In addition, the satellite 700 may include other circuitry. The communication unit may include a receiver configured to receive a notification that the user equipment requests to switch the current communication mode with the satellite, and a transmitter configured to transmit an instruction on switching to the user equipment in response to the notification.

The processer 701 is configured to at least perform one of the following operations: determining whether the user equipment needs the assistant device; determining whether the user equipment is required to retransmit data after waiting for a delay period; determining whether the user equipment performs random access again; determining a communication mode to which the user equipment intends to switch; configuring the user equipment to search for the assistant device; generating a white list of assistant devices; generating a white list of satellites; and determining a delay period.

Figure 8:
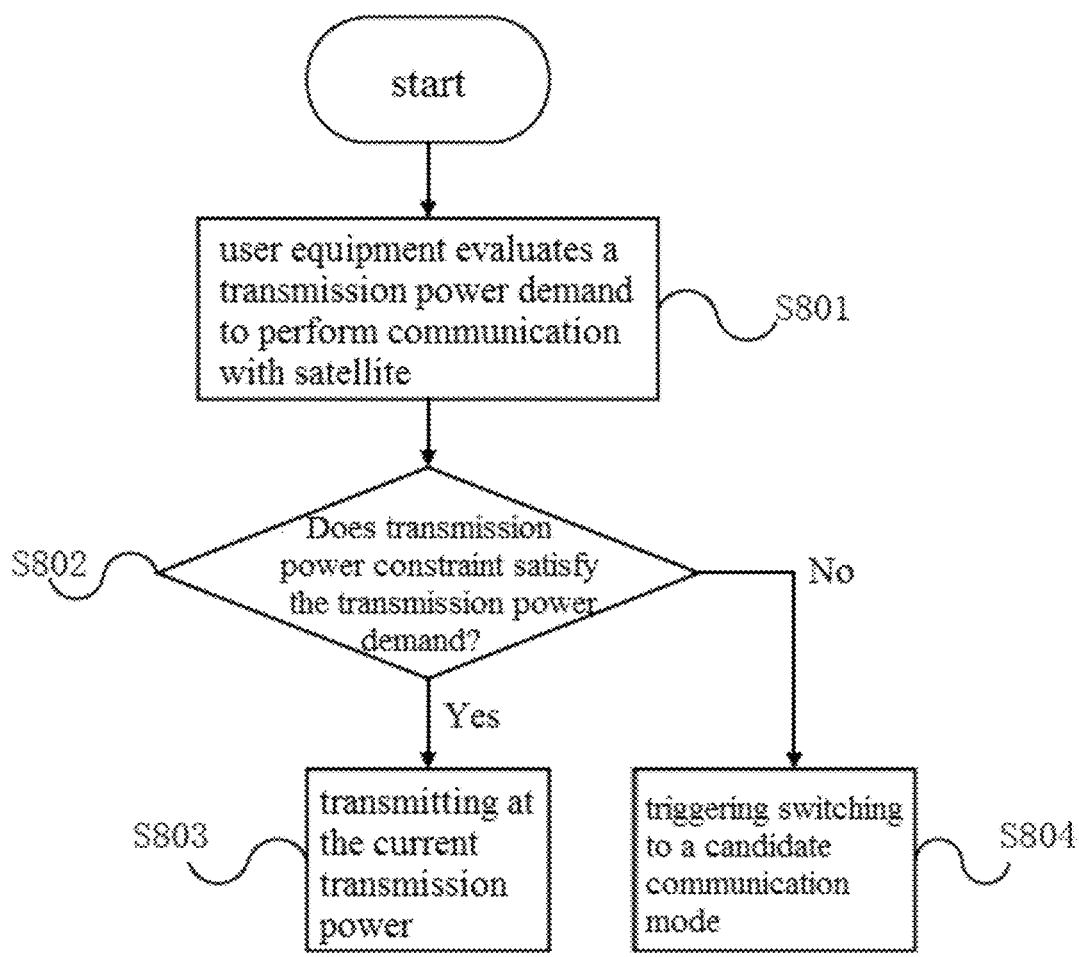
FIG. 8 shows a flowchart of a method for performing satellite communication in a satellite communication system according to an embodiment of the present disclosure.

FIG. 8 shows a method for performing satellite communication in a satellite communication system according to an embodiment of the present disclosure. In step S801, the user equipment evaluates a transmission power demand to perform communication with a satellite. In step S802, it is determined whether a transmission power constraint of the user equipment satisfies a transmission power demand; in a case that the transmission power constraint of the user equipment satisfies the transmission power demand, the method proceeds to step S803, and transmission is performed at a current transmission power; and in a case that the transmission power constraint of the user equipment cannot satisfy the transmission power demand, the method proceeds to S804, the user equipment triggers switching to a communication mode in which the transmission power constraint satisfies the transmission power demand.

According to the various embodiments of the present disclosure, the user equipment consumes great power in calculating the transmission power demand. Therefore, the assistant device such as the base station may assist the user equipment to calculate values of the transmission power of an uplink link of the satellite. The assistant device such as the base station may complete calculation of the transmission power demand, thereby reducing power consumption of the user.

It should be noted that, a computer readable storage medium is further provided according to an embodiment of the present disclosure. The computer readable storage medium includes executable computer instructions which, when being executed by a computer, cause the computer to implement the methods according to the embodiments of the present disclosure.

The technology of the present disclosure may be applied to various products. For example, the assistant device described in the present disclosure may be a base station. The base station may be implemented as any type of evolved Node B(eNB), such as a macro eNB and a small eNB. The small eNB may be an eNB covering a cell smaller than a macro cell, such as a pico eNB, a micro eNB and a home (femto) eNB. Alternatively, the base station may be implemented as any other type of base station, such as NodeB and a base station transceiver station (BTS). The base station may include: a body configured to control wireless communication (also referred to as a base station device); and one or more remote radio head end (RRH) located at a place different from the body. In addition, various types of terminal described below may function as a base station by performing functions of the base station temporarily or in a semi-persistent manner.

For example, The UE described in the present disclosure may be a mobile terminal (for example a smartphone, a tablet personal computer (PC), a notebook PC, a portable game terminal, a portable/dongle mobile router and a digital camera) or a vehicle terminal (such as a vehicle navigation device). The UE may be implemented as a terminal performing machine to machine (M2M) communication (also referred to as a machine type communication (MTC) terminal). In addition, the UE may be a wireless communication module (for example an integrated circuit module including a single chip) installed in each of the above terminals.

Figure 9:
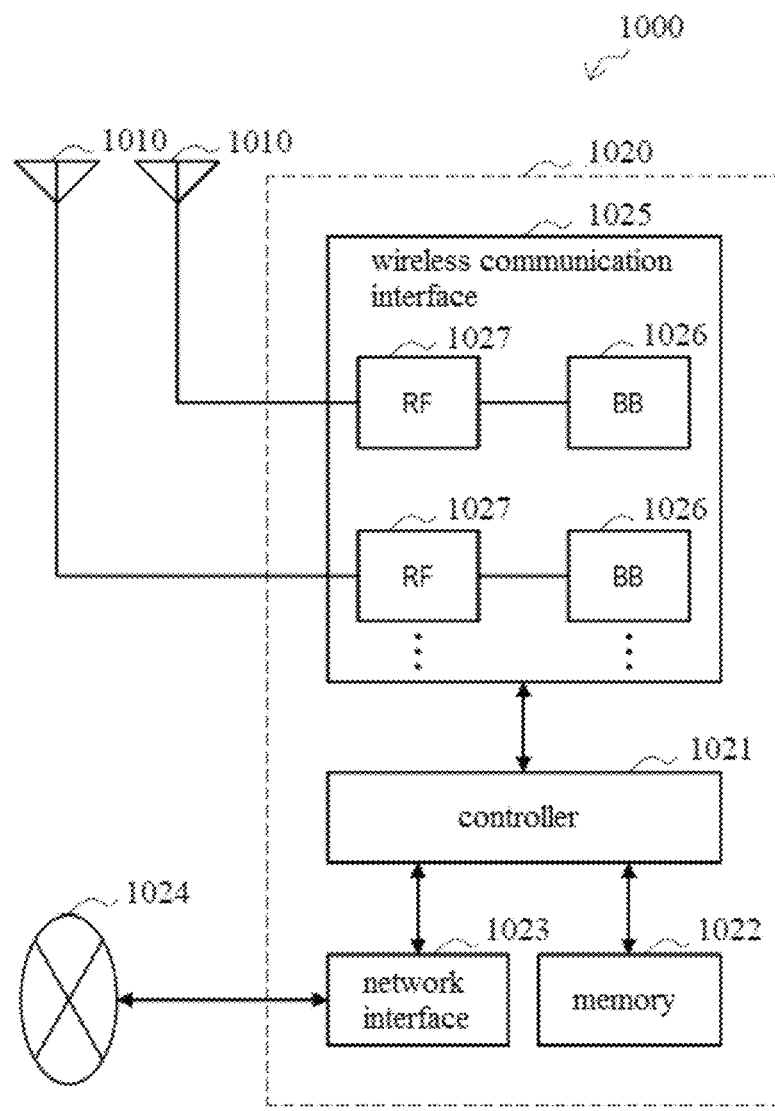
FIG. 9 shows a block diagram of a first example of a schematic configuration of an eNB (evolution Node Base station) or gNB (a base station in a fifth generation of communication system) to which the present disclosure is applicable.

FIG. 9 is a block diagram showing a first example of a schematic configuration of an eNB to which the technology of the present disclosure may be applied. An eNB 1000 includes one or more antennas 1010 and a base station device 1020. The base station device 1020 and each of the antennas 1010 may be connected with each other via an RF cable.

Each of the antennas 1010 includes one or more antenna elements (such as multiple antenna elements included in a multiple-input multiple-output (MIMO) antenna), and is used for sending and receiving a radio signal by the base station device 1020. The eNB 1000 may include the multiple antennas 1010, as shown in FIG. 9. For example, the multiple antennas 1010 may be compatible with multiple frequency bands used by the eNB 1000. Although FIG. 9 illustrates an example in which the eNB 1000 includes multiple antennas 1010, the eNB 1000 may also include a single antenna 1010. The base station as the assistant device according to the embodiment of the present disclosure is required to have the capability to communicate with the satellite in the air, in addition to the capability to communicate with the ground user. In this case, in addition to being provided with the conventional antennas for receiving signals in the ground direction, the base station as the assistant device is also provided with the antenna for receiving signals in the air direction.

The base station device 1020 includes a controller 1021, a memory 1022, a network interface 1023, and a wireless communication interface 1025.

The controller 1021 may be a CPU or a DSP and control various functions of higher layers of the base station device 1020. For example, the controller 1021 generates a data packet based on data in a signal processed by the wireless communication interface 1025, and transfers the generated packet via a network interface 1023. The controller 1021 may bundle data from multiple baseband processors to generate bundled packet, and transfer the generated bundled packet. The controller 1021 may have logical functions of performing control such as radio resource control, radio bearer control, mobility management, admission control, and scheduling. The control may be performed in conjunction with an adjacent eNB or a core network node. The memory 1022 includes RAM and ROM, and stores a program that is executed by the controller 1021, and various types of control data (such as a terminal list, transmission power data, and scheduling data).

The network interface 1023 is a communication interface for connecting the base station device 1020 to a core network 1024. The controller 1021 may communicate with a core network node or another eNB via the network interface 1023. In that case, the eNB 1000 and the core network node or the other eNB may be connected to each other through a logical interface (such as an S1 interface and an X2 interface). The network interface 1023 may also be a wired communication interface or a wireless communication interface for radio backhaul. If the network interface 1023 is a wireless communication interface, it may use a higher frequency band for wireless communication than a frequency band used by the wireless communication interface 1025.

The wireless communication interface 1025 supports any cellular communication scheme (such as Long Term Evolution (LTE) and LTE-Advanced), and provides wireless connection to a terminal positioned in a cell of the eNB 1000 via the antenna 1010. The wireless communication interface 1025 may typically include, for example, a base band (BB) processor 1026 and an RF circuit 1027. The BB processor 1026 may perform, for example, coding/decoding, modulation/demodulation and multiplexing/de-multiplexing, and perform various types of signal processes of the layers (for example L1, media access control (MAC), radio link control (RLC) and packet data convergence protocol (PDCP)). Instead of the controller 1021, the BB processor 1026 may have a part or all of the above-described logical functions. The BB processor 1026 may be a memory that stores the communication control program, or a module that includes a processor and related circuitry configured to perform the program. The function of the BB processor 1026 may be changed when the programs are updated. The module may be a card or a blade that is inserted into a slot of the base station device 1020. Alternatively, the module may be a chip that is mounted on the card or the blade. Meanwhile, the RF circuit 1027 may include, for example, a frequency mixer, a filter and an amplifier, and send and receive a radio signal via the antenna 1010.

As shown in FIG. 9, the wireless communication interface 1025 may include multiple BB processors 1026. For example, multiple BB processors 1026 may be compatible with multiple frequency bands used by the eNB 1000. As shown in FIG. 9, the wireless communication interface 1025 may include multiple RF circuits 1027. For example, the multiple RF circuits 1027 may be compatible with multiple antenna elements. Although an example in which the wireless communication interface 1025 includes multiple BB processors 1026 and multiple RF circuits 1027 is shown in FIG. 9, the wireless communication interface 1025 may also include a single BB processor 1026 or a single RF circuit 1027.

Figure 10:
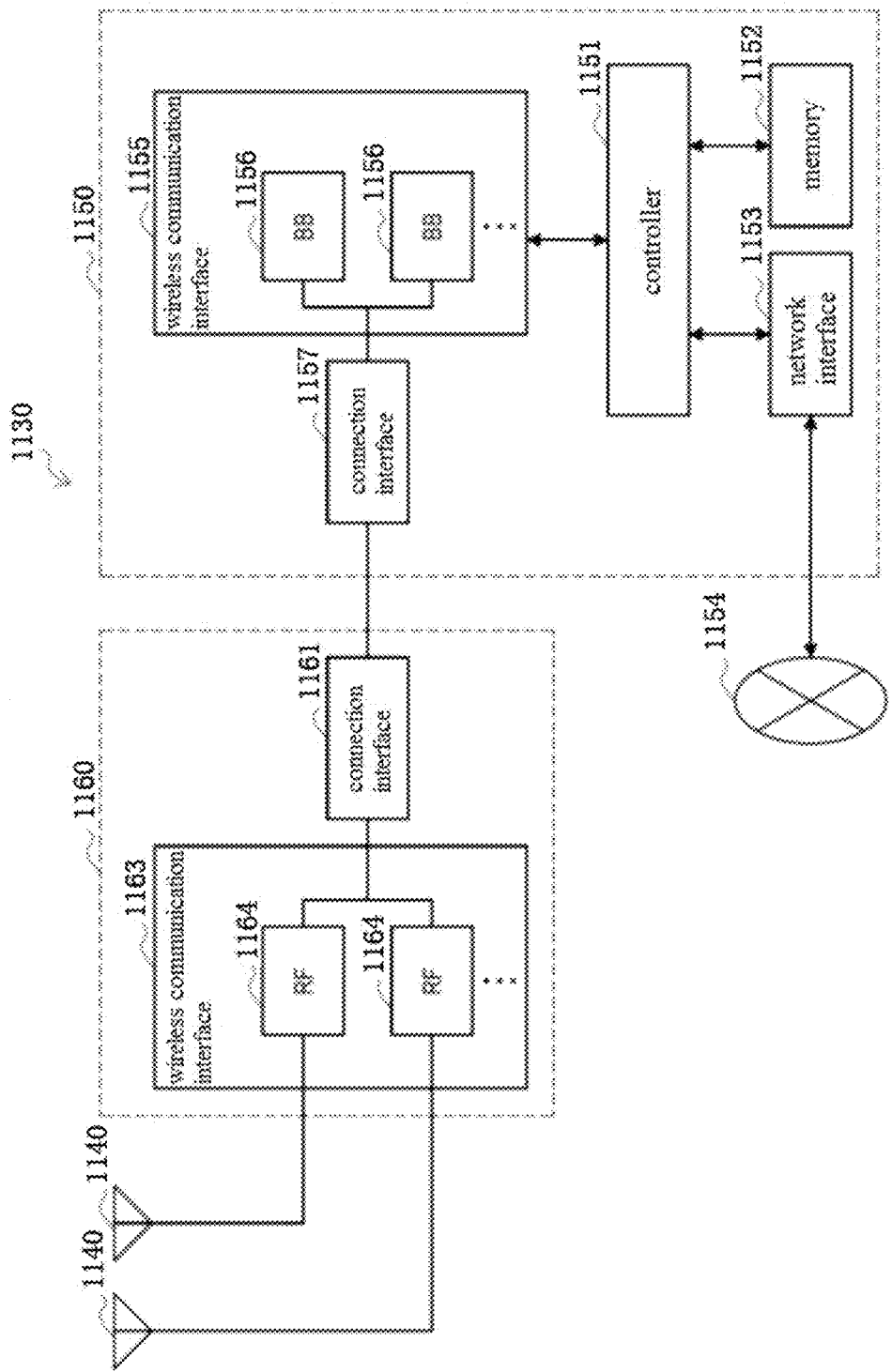
FIG. 10 shows a block diagram of a second example of the schematic configuration of the eNB or gNB to which the present disclosure is applicable.

FIG. 10 is a block diagram showing a second example of a schematic configuration of an eNB functioning as a base station to which the technology according to the present disclosure may be applied. An eNB 1130 includes one or more antennas 1140, a base station device 1150 and an RRH 1160. Each antenna 1140 and the RRH 1160 may be connected to each other via an RF cable. The base station device 1150 and the RRH 1160 may be connected to each other via a high-speed line such as a fiber cable.

Each of the antennas 1140 includes one or more antenna elements (such as the multiple antenna elements included in the MIMO antenna), and is used for sending and receiving the radio signal by the RRH 1160. As shown in FIG. 10, the eNB 1130 may include multiple antennas 1140. For example, the multiple antennas 1140 may be compatible with multiple frequency bands used by the eNB 1130. Although an example in which the eNB 1130 includes multiple antennas 1140 is shown in FIG. 10, the eNB 1130 may also include a single antenna 1140.

The base station device 1150 includes a controller 1151, a memory 1152, a network interface 1153, a wireless communication interface 1155, and a connection interface 1157. The controller 1151, the memory 1152, and the network interface 1153 are the same as the controller 1021, the memory 1022, and the network interface 1023 described with reference to FIG. 9.

The wireless communication interface 1155 supports any cellular communication solution (such as LTE and LTE-advanced), and provides wireless communication with a terminal located in a sector corresponding to the RRH 1160 via the RRH 1160 and the antenna 1140. The wireless communication interface 1155 may typically include, for example, a BB processor 1156. Other than connecting to an RF circuit 1164 of the RRH 1160 via the connection interface 1157, the BB processor 1156 is the same as the BB processor 1026 described with reference to FIG. 9. As show in FIG. 10, the wireless communication interface 1155 may include multiple BB processors 1156. For example, the multiple BB processors 1156 may be compatible with the multiple frequency bands used by the eNB 1130. Although FIG. 10 illustrates an example in which the wireless communication interface 1155 includes multiple BB processors 1156, the wireless communication interface 1155 may also include a single BB processor 1156.

The connection interface 1157 is an interface for connecting the base station device 1150 (the wireless communication interface 1155) to the RRH 1160. The connection interface 1157 may also be a communication module for communication in the above-described high-speed line that connects the base station device 1150 (the wireless communication interface 1155) to the RRH 1160.

The RRH 1160 includes a connection interface 1161 and a wireless communication interface 1163.

The connection interface 1161 is an interface for connecting the RRH 1160 (the wireless communication interface 1163) to the base station device 1150. The connection interface 1161 may also be a communication module for the communication in the above high-speed line.

The wireless communication interface 1163 sends and receives a radio signal via the antenna 1140. The wireless communication interface 1163 may generally include, for example, the RF circuit 1164. The RF circuit 1164 may include, for example, a frequency mixer, a filter and an amplifier, and send and receive a radio signal via the antenna 1140. The wireless communication interface 1163 may include multiple RF circuits 1164, as shown in FIG. 10. For example, the multiple RF circuits 1164 may support multiple antenna elements. Although FIG. 10 illustrates the example in which the wireless communication interface 1163 includes the multiple RF circuits 1164, the wireless communication interface 1163 may also include a single RF circuit 1164.

In the eNB 1000 shown in FIG. 9 and the eNB 1130 shown in FIG. 10, the processing circuitry 610 described with reference to FIG. 6 may be implemented by the controller 1021 and/or the controller 1151, and the communication unit 620 described with reference to FIG. 6 may be implemented by the wireless communication interface 1025 and the wireless communication interface 1155 and/or the wireless communication interface 1163. At least a part of the functions may be implemented by the controller 1021 and the controller 1151. For example, the controller 1021 and/or the controller 1151 may perform the control function by executing instructions stored in a corresponding memory.

Figure 11:
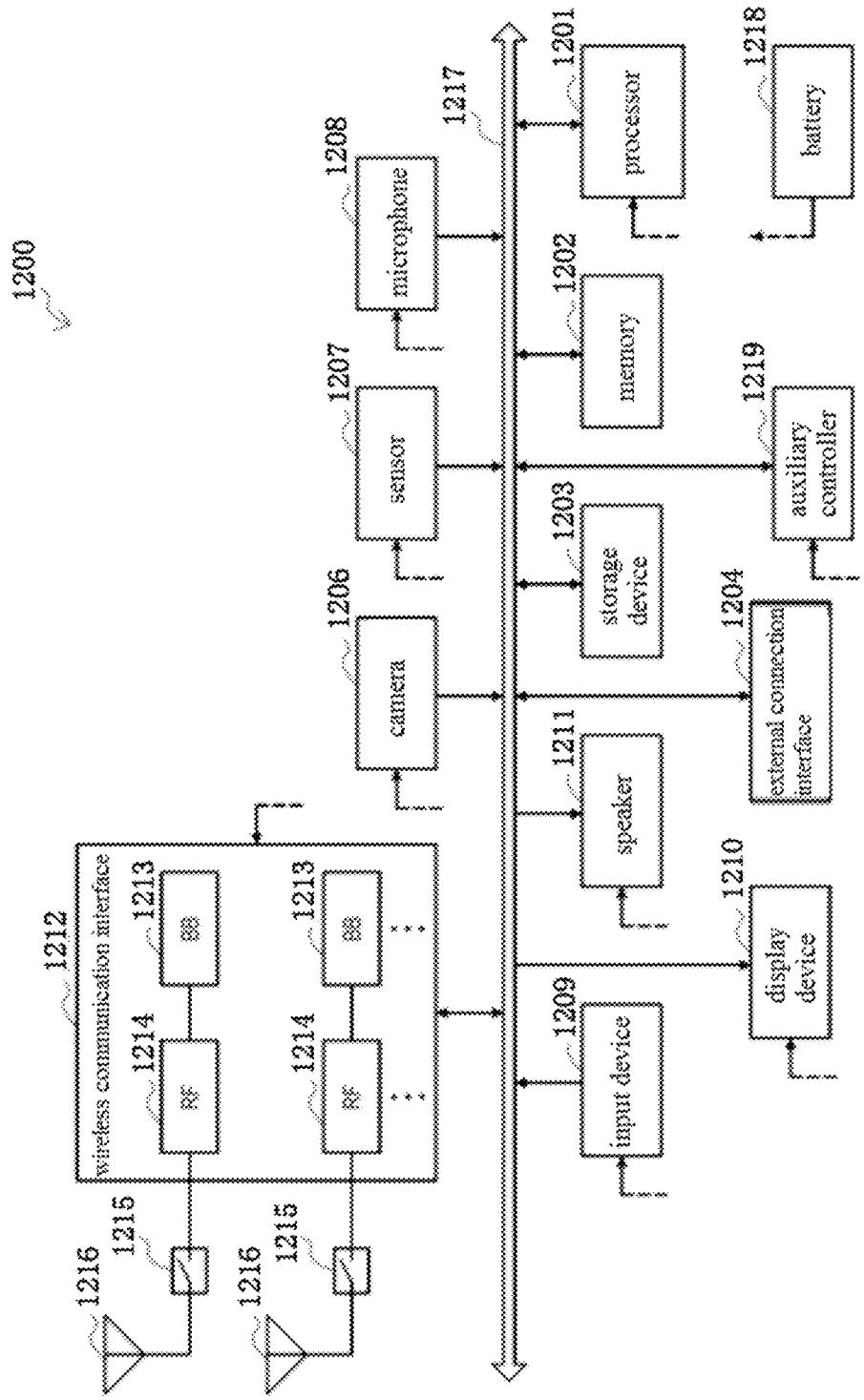
FIG. 11 shows a block diagram of an example of a schematic configuration of a smart phone to which the present disclosure is applicable.

FIG. 11 is a block diagram showing an example of exemplary configuration of a smartphone 1200 to which the technology of the present disclosure may be applied. The smart phone 1200 includes a processor 1201, a memory 1202, a storage device 1203, an external connection interface 1204, a camera 1206, a sensor 1207, a microphone 1208, an input device 1209, a display device 1210, a speaker 1211, a wireless communication interface 1212, one or more antenna switches 1215, one or more antennas 1216, a bus 1217, a battery 1218 and an auxiliary controller 1219.

The processor 1201 may be, for example, a CPU or a system on chip (SoC), and control functions of an application layer and other layers of the smart phone 1200. The memory 1202 includes a RAM and a ROM, and stores a program that is executed by the processor 1201, and data. The storage device 1203 may include a storage medium such as a semiconductor memory and a hard disk. The external connection interface 1204 is an interface for connecting an external device (such as a memory card and a universal serial bus (USB) device) to the smart phone 1200.

The camera 1206 includes an image sensor such as a charge coupled device (CCD) and a complementary metal oxide semiconductor (CMOS), and generates a captured image. The sensor 1207 may include a group of sensors such as a measurement sensor, a gyro sensor, a geomagnetic sensor, and an acceleration sensor. The microphone 1208 converts sounds that are inputted to the smart phone 1200 into audio signals. The input device 1209 includes, for example, a touch sensor configured to detect touch onto a screen of the display device 1210, a keypad, a keyboard, a button, or a switch, and receive an operation or information inputted from a user. The display device 1210 includes a screen such as a liquid crystal display (LCD) and an organic light-emitting diode (OLED) display, and displays an output image of the smart phone 1200. The speaker 1211 converts audio signals that are outputted from the smartphone 1200 to sounds.

The wireless communication interface 1212 supports any cellular communication scheme (such as LTE and LTE-Advanced), and performs wireless communication. The wireless communication interface 1212 may typically include, for example, a base band (BB) processor 1213 and a RF circuit 1214. The BB processor 1213 may perform encoding/decoding, modulating/demodulating and multiplexing/demultiplexing, for example, and perform various types of signal processing for wireless communication. The RF circuit 1214 may include a frequency mixer, a filter and an amplifier, for example, and send and receive a radio signal via the antenna 1216. The wireless communication interface 1212 may be a chip module having the BB processor 1213 and the RF circuit 1214 integrated thereon. The wireless communication interface 1212 may include multiple BB processors 1213 and multiple RF circuits 1214, as shown in FIG. 11. Although FIG. 11 illustrates the example in which the wireless communication interface 1212 includes the multiple BB processors 1213 and the multiple RF circuits 1214, the wireless communication interface 1212 may also include a single BB processor 1213 or a single RF circuit 1214.

Moreover, in addition to a cellular communication scheme, the wireless communication interface 1212 may also support a wireless communication scheme of another type, such as a short-distance wireless communication scheme, a near field communication scheme, and a wireless local area network (LAN) scheme. In this case, the wireless communication interface 1212 may include a BB processor 1213 and an RF circuit 1214 for each wireless communication scheme.

Each of the antenna switches 1215 switches connection destinations of the antennas 1216 among multiple circuits (such as circuits for different wireless communication schemes) included in the wireless communication interface 1212.

Each of the antennas 1216 includes one or more antenna elements (such as multiple antenna elements included in an MIMO antenna), and is used for the wireless communication interface 1212 to send and receive radio signals. The smartphone 1200 may include the multiple antennas 1216, as shown in FIG. 11. Although FIG. 11 illustrates the example in which the smartphone 1200 includes the multiple antennas 1216, the smartphone 1200 may also include a single antenna 1216.

In addition, the smart phone 1200 may include an antenna 1216 for each wireless communication scheme. In this case, the antenna switches 1215 may be omitted from the configuration of the smart phone 1200.

The bus 1217 connects the processor 1201, the memory 1202, the storage device 1203, the external connection interface 1204, the camera 1206, the sensor 1207, the microphone 1208, the input device 1209, the display device 1210, the speaker 1211, the wireless communication interface 1212, and the auxiliary controller 1219 to each other. The battery 1218 supplies power to each block of the smartphone 1200 shown in FIG. 20 via feeders which are partially shown by dashed lines in the figure. The auxiliary controller 1219 operates a minimum necessary function of the smartphone 1200, for example, in a sleep mode.

In the smartphone 1200 shown in FIG. 11, the processing circuitry 510 described with reference to FIG. 5 and the obtaining unit 511 and the estimating unit 512 in the processing circuitry 510 may be implemented by the processor 1201 and the auxiliary controller 1219, and the communication unit 520 described with reference to FIG. 5 may be implemented by the wireless communication interface 1212. At least a part of the functions may be implemented by the processor 1201 or the auxiliary controller 1219. For example, the processor 1201 or the auxiliary controller 1219 may perform the information obtaining function and the estimating function by executing instructions stored in the memory 1202 or the storage device 1203.

Figure 12:
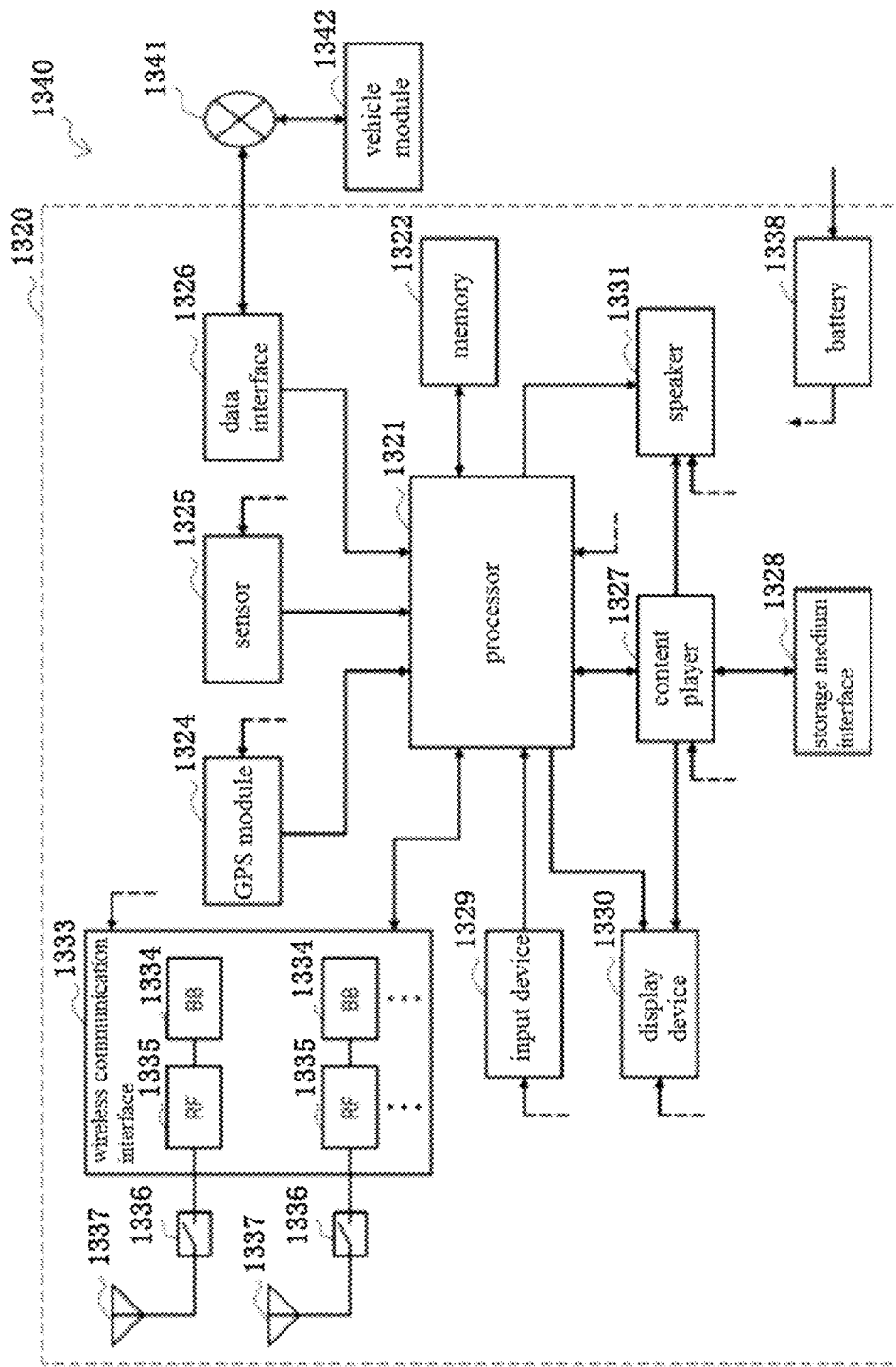
FIG. 12 shows a block diagram of an example of a schematic configuration of a vehicle navigation device to which the present disclosure is applicable.

FIG. 12 is a block diagram showing an example of a schematic configuration of a vehicle navigation device 1320 to which the technology according to the present disclosure may be applied. The vehicle navigation device 1320 includes a processor 1321, a memory 1322, a global positioning system (GPS) module 1324, a sensor 1325, a data interface 1326, a content player 1327, a storage medium interface 1328, an input device 1329, a display device 1330, a speaker 1331, a wireless communication interface 1333, one or more antenna switches 1336, one or more antennas 1337, and a battery 1338.

The processor 1321 may be for example the CPU or the SoC, and control the navigation function and other functions of the vehicle navigation device 1320. The memory 1322 includes a RAM and a ROM, and stores a program that is executed by the processor 1321 and data.

The GPS module 1324 determines a position (such as latitude, longitude, and altitude) of the vehicle navigation device 1320 by using GPS signals received from a GPS satellite. The sensor 1325 may include a group of sensors such as a gyroscope sensor, a geomagnetic sensor and an air pressure sensor. The data interface 1326 is connected to, for example, an in-vehicle network 1341 via a terminal that is not shown, and acquires data generated by the vehicle, such as vehicle speed data.

The content player 1327 reproduces content stored in a storage medium (such as a CD and a DVD) that is inserted into the storage medium interface 1328. The input device 1329 includes, for example, a touch sensor configured to detect touch on a screen of the display device 1330, a button, or a switch, and receives an operation or information inputted from a user. The display device 1330 includes a screen such as a LCD or an OLED display, and displays an image of the navigation function or content that is reproduced. The speaker 1331 outputs sounds of the navigation function or the content that is reproduced.

The wireless communication interface 1333 supports any cellular communication scheme (such as LTE and LTE-advanced) and performs wireless communication. The wireless communication interface 1333 may typically include, for example, a BB processor 1334 and an RF circuit 1335. The BB processor 1334 may perform encoding/decoding, modulating/demodulating and multiplexing/demultiplexing, for example, and perform various types of signal processing for wireless communication. The RF circuit 1335 may include a mixer, a filter and an amplifier, for example, and send and receive a radio signal via the antenna 1337. The wireless communication interface 1333 may also be one chip module that has the BB processor 1334 and the RF circuit 1335 integrated thereon. The wireless communication interface 1333 may include multiple BB processors 1334 and multiple RF circuits 1335, as shown in FIG. 12. Although FIG. 12 shows the example in which the wireless communication interface 1333 includes the multiple BB processors 1334 and the multiple RF circuits 1335, the wireless communication interface 1333 may also include a single BB processor 1334 or a single RF circuit 1335.

In addition to the cellular communication scheme, the wireless communication interface 1333 may also support a wireless communication scheme of another type, such as a short-distance wireless communication scheme, a near field communication scheme, and a wireless LAN scheme. In this case, the wireless communication interface 1333 may include a BB processor 1334 and a RF circuit 1335 for each wireless communication scheme.

Each of the antenna switches 1336 switches connection destinations of the antenna 1337 among multiple circuits (such as circuits for different wireless communication schemes) included in the wireless communication interface 1333.

Each of the antennas 1337 includes one or more antenna elements (such as multiple antenna elements included in the MIMO antenna), and is used for the wireless communication interface 1333 to send and receive a radio signal. The vehicle navigation device 1320 may include multiple antennas 1337, as shown in FIG. 12. Although FIG. 12 illustrates the example in which the vehicle navigation device 1320 includes the multiple antennas 1337, the vehicle navigation device 1320 may also include a single antenna 1337.

Furthermore, the vehicle navigation device 1320 may include the antenna 1337 for each wireless communication scheme. In this case, the antenna switches 1336 may be omitted from the configuration of the vehicle navigation device 1320.

The battery 1338 supplies power to each block of the vehicle navigation device 1320 shown in FIG. 12 via feeders which are partially shown by dashed lines in the figure. The battery 1338 accumulates power supplied from the vehicle.

In the vehicle navigation device 1320 shown in FIG. 12, the processing circuitry 510 described with reference to FIG. 5, and the communication unit 520 described with reference to FIG. 5 may be implemented by the wireless communication interface 1033. At least a part of functions may be implemented by the processor 1321. For example, the processor 1321 may perform various functions by executing instructions stored in the memory 1322.

In the system and method of the present disclosure, apparently, various components or steps may be decomposed and/or recombined. The decomposition and/or recombination should be regarded as equivalent solution of the present disclosure. In addition, steps for performing the above series of processing may be performed naturally in a time order according to the description order, but the steps are unnecessary to be performed in the time order. Some steps may be performed in parallel or independently.

The embodiments of the present disclosure are described in detail in conjunction with the drawings above. However, it should be understood that the embodiments described above are intended to illustrate the present disclosure rather than limit the present disclosure. Those skilled in the art may make various changes and modifications to the embodiments without departing from the essence and scope of the present disclosure. Therefore, the scope of the present disclosure is defined by the attached claims and equivalents thereof.

The invention claimed is:

1. A user equipment capable of performing communication, comprising:
   one or more processing circuitries configured to:
   evaluate a transmission power demand of the user equipment to perform communication with a communication node;
   determine to switch to a candidate communication mode when it is determined that a transmission power constraint fails to satisfy the transmission power demand;
   send to the communication node a notification indicating a necessity of switching to the candidate communication mode; and
   receive a command indicating whether an assistant device is required to assist the user equipment in performing the communication;
   wherein when the assistant device is required to assist the user equipment in performing the communication, the user equipment transmits at least a portion of transmission information of the user equipment to the communication node, and rest of the transmission information of the user equipment is transmitted from the user equipment to the communication node via the assistant device.

2. The user equipment according to claim 1, wherein the at least the portion of transmission information of the user equipment is derived from the transmission information of the user equipment based on transmission power limitation.

3. The user equipment according to claim 1, wherein the one or more processing circuitries are further configured to search for the assistant device after receiving the command.

4. The user equipment according to claim 1, wherein the one or more processing circuitries are further configured to determine the assistant device based on the command.

5. A method of performing communication node communication, comprising:
   evaluating a transmission power demand of the user equipment to perform communication with a communication node;

determining to switch to a candidate communication mode when it is determined that a transmission power constraint fails to satisfy the transmission power demand;

sending to the communication node a notification indicating a necessity of switching to the candidate communication mode; and receiving a command indicating whether an assistant device is required to assist the user equipment in performing the communication, wherein when the assistant device is required to assist the user equipment in performing the communication, the user equipment transmits at least a portion of transmission information of the user equipment to the communication node, and rest of the transmission information of the user equipment is transmitted from the user equipment to the communication node via the assistant device.

6. A communication node, comprising:

one or more processing circuitries configured to:

receive a notification from a user equipment, the notification indicating a necessity of switching to a candidate communication mode which is determined under a condition that a transmission power constraint fails to satisfy a transmission power demand of the user equipment, the transmission power demand of the user equipment being evaluated by the user equipment to perform communication with the communication node; and receive at least a portion of transmission information of the user equipment from the user equipment and rest of the transmission information of the user equipment from the user equipment via an assistant device, under a condition that the assistant device is required to assist the user equipment in performing the communication based on a command received at the user equipment, the command indicating whether the assistant device is required to assist the user equipment in performing the communication.

7. The communication node according to claim 6, wherein the at least the portion of transmission information of the user equipment is derived from the transmission information of the user equipment based on transmission power limitation.

8. The communication node according to claim 6, wherein search for the assistant device by the user equipment is performed based on the command.

9. The communication node according to claim 6, wherein the assistant device is determined by the user equipment based on the command.

* * * * *